(12) United States Patent
Yamada et al.

(10) Patent No.: US 9,731,629 B2
(45) Date of Patent: Aug. 15, 2017

(54) SEAT SLIDE APPARATUS FOR VEHICLE

(71) Applicant: AISIN SEIKI KABUSHIKI KAISHA, Kariya-shi (JP)

(72) Inventors: Yukifumi Yamada, Toyota (JP); Yasuhiro Kojima, Kariya (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 471 days.

(21) Appl. No.: 14/284,604

(22) Filed: May 22, 2014

(65) Prior Publication Data

US 2014/0353454 A1 Dec. 4, 2014

(30) Foreign Application Priority Data

May 30, 2013 (JP) ................................. 2013-114114

(51) Int. Cl.
| | |
|---|---|
| *F16M 13/00* | (2006.01) |
| *B60N 2/07* | (2006.01) |
| *B60N 2/08* | (2006.01) |
| *B60N 2/12* | (2006.01) |

(52) U.S. Cl.
CPC ......... *B60N 2/0705* (2013.01); *B60N 2/0715* (2013.01); *B60N 2/0818* (2013.01); *B60N 2/0875* (2013.01); *B60N 2/123* (2013.01)

(58) Field of Classification Search
CPC .. B60N 2/0705; B60N 2/0715; B60N 2/0818; B60N 2/0875; B60N 2/123

USPC ............. 248/424, 430; 296/65.13; 297/344.1
See application file for complete search history.

(56) References Cited

U.S. PATENT DOCUMENTS 8,616,515 B2 * 12/2013 Hayashi ............... B60N 2/0705
248/424
2011/0298264 A1 12/2011 Ito et al.

FOREIGN PATENT DOCUMENTS

JP 2009-62006 3/2009

* cited by examiner

*Primary Examiner* — Gwendolyn Baxter
(74) *Attorney, Agent, or Firm* — Oblon, McClelland, Maier & Neustadt, L.L.P.

(57) ABSTRACT

A seat slide apparatus for a vehicle includes a lower rail, an upper rail, a lock member, a stopper portion, a lever member that rotates in a release direction in association with a forward folding of a seatback, and a memory link being released from the lever member in a state where the lever member rotates in the release direction and rotating to an engageable position at which the memory link is engageable with the stopper portion, the memory link being configured to pass through the stopper portion in a case where the upper rail moves to a front side of the seat, the memory link engaging with the stopper portion to restrict the upper rail from moving to a rear side of the seat in a case where the upper rail moves to the rear side of the seat after the memory link passes through the stopper portion.

12 Claims, 25 Drawing Sheets

Width direction

Width direction

Front ←          → Rear

Width direction

Front ← → Rear

SEAT SLIDE APPARATUS FOR VEHICLE

CROSS REFERENCE TO RELATED APPLICATIONS

This application is based on and claims priority under 35 U.S.C. §119 to Japanese Patent Application 2013-114114, filed on May 30, 2013, the entire content of which is incorporated herein by reference.

TECHNICAL FIELD

This disclosure generally relates to a seat slide apparatus for a vehicle.

BACKGROUND DISCUSSION

A known seat slide apparatus for a vehicle is disclosed, for example, in JP2009-62006A which will be hereinafter referred to as Reference 1. Specifically, as illustrated in FIGS. 27A, 27B, and 27C, the seat slide apparatus disclosed in Reference 1 includes a lower rail 201, an upper rail 202 connected to the lower rail 201 so as to be relatively movable thereto, and a lock lever 203 selectively locking or restricting the relative movement of the upper rail 202 relative to the lower rail 201. The seat slide apparatus also includes a control lever 210 and a cancel lever 220 each of which is connected to the upper rail 202 to be rotatable thereto.

As illustrated in FIGS. 28A, 28B, and 28C, in a case where a cable 205 is pulled in association with a forward folding of a seatback of a seat at which the seat slide apparatus is provided and the control lever 210 is rotated, a lock lever contact portion 211 of the control lever 210 pushes or presses a control lever contact portion 204 of the lock lever 203. As a result, the locking (restriction) of the relative movement of the upper rail 202 relative to the lower rail 201 is released (i.e., a released state of the locking). That is, in a state where the seatback is folded forward (i.e., the seatback is in a forward folded state), the released state of the locking of the relative movement of the upper rail 202 relative to the lower rail 201 is maintained.

At this time, a second cancel lever contact portion 212 of the control lever 210 is separated from a second control lever contact portion 221 of the cancel lever 220 that is biased to rotate. Thus, a memory plate contact portion 222 of the cancel lever 220 makes contact with an upper surface of a memory plate 206 provided at the lower rail 201.

Afterwards, in a case where the upper rail 202 moves relative to the lower rail 201 in one direction, i.e., in a leftward direction in FIG. 28B, the cancel lever 220 is separated from the memory plate 206 to thereby further rotate until a first control lever contact portion 223 of the cancel lever 220 makes contact with a first cancel lever contact portion 213 of the control lever 210. At this time, an end portion, specifically, a lower end portion, of the memory plate contact portion 222 of the cancel lever 220 is positioned lower than an end portion, specifically, an upper end portion, of the memory plate 206.

Accordingly, in a case where the upper rail 202 that moves relative to the lower rail 201 in the aforementioned one direction changes the moving direction to an opposite direction, the cancel lever 220 rotates in a state where the memory plate contact portion 222 climbs up or override the memory plate 206. Then, the first control lever contact portion 223 of the cancel lever 220 is separated from the first cancel lever contact portion 213 of the control lever 210. In the aforementioned state, in a case where the seatback is pulled back to release the forward folded state, the control lever 210 returns to rotate so that the lock lever contact portion 211 of the control lever 210 is separated from the control lever contact portion 204 of the lock lever 203. As a result, the relative movement of the upper rail 202 relative to the lower rail 201 is locked or restricted. That is, the lower rail 201 and the upper rail 202 return to a relative position which will be hereinafter also referred to as a neutral position at which the end portion of the memory plate contact portion 222 matches the end portion of the memory plate 206.

According to the seat slide apparatus disclosed in Reference 1, on the assumption that the upper rail 202 moves in the opposite direction until the cancel lever 220 that is in separation from the memory plate 206 returns to the position that matches the position of the memory plate 206, i.e., on the assumption that the upper rail 202 returns to the neutral position, the control lever 210 (specifically, the first cancel lever contact portion 213) is released from the cancel lever 220 (specifically, the first control lever contact portion 223) so that the cancel lever 220 is brought to be rotatable.

Specifically, in a case where the seatback is pulled back to release the forward folded state while the cancel lever 220 is being in separation from the memory plate 206, the control lever 210 is inhibited from rotating, so that the lock lever contact portion 211 of the control lever 210 keeps pressing down the control lever contact portion 204 of the lock lever 203. Thus, the released state of the locking of the relative movement of the upper rail 202 relative to the lower rail 201 is maintained. As a result, even in a case where the relative movement of the upper rail 202 relative to the lower rail 201 is not locked by the lock lever 203, the seatback is brought to a state so that an occupant may be seated in the seat, which may lead to deterioration in operability of the seat slide apparatus.

A need thus exists for a seat slide apparatus for a vehicle which is not susceptible to the drawback mentioned above.

SUMMARY

According to an aspect of this disclosure, a seat slide apparatus for a vehicle includes a lower rail configured to be fixed to a vehicle floor, an upper rail configured to be fixed to a seat and connected to the lower rail to be movable relative to the lower rail in a front-rear direction of the seat, the seat including a seatback that is provided at a rear end of the seat in the front-rear direction, a lock member rotatably connected to the upper rail and selectively restricting a relative movement between the lower rail and the upper rail, a stopper portion provided at the lower rail, a lever member rotatably connected to the upper rail and being held at an initial rotation position at which the lever member releases the lock member by a biasing force of a lever biasing member, the lever member rotating in a release direction against the biasing force of the lever biasing member in association with a forward folding of the seatback to press the lock member in a rotation direction in which the restriction of the relative movement between the lower rail and the upper rail is released, and a memory link rotatably connected to the upper rail and being held at a separation position at which the memory link is inhibited from engaging with the stopper portion in a state to be restricted from rotating by the lever member that is arranged at the initial rotation position, the memory link being released from the lever member in a state where the lever member rotates in the release direction and rotating to an engageable position at which the memory link is engageable with the stopper portion by a biasing force of a memory link biasing member, the memory link being configured to pass through the stopper portion in a case where the upper rail moves to a front side of the seat, the memory link engaging with the stopper portion to restrict the upper rail from moving to a rear side of the seat in a case where the upper rail moves to the rear side of the seat after the memory link passes through the stopper portion.

According to another aspect of this disclosure, a seat slide apparatus for a vehicle includes a lower rail attached to a vehicle floor, an upper rail attached to a seat and connected to the lower rail to be movable relative to the lower rail in a front-rear direction of the seat, the seat including a seatback that is provided at a rear end of the seat in the front-rear direction, a lock member rotatably connected to the upper rail and selectively restricting a relative movement between the lower rail and the upper rail, a stopper portion provided at the lower rail, a lever member rotatably connected to the upper rail, a lever biasing member biasing the lever member, a memory link rotatably connected to the upper rail, and a memory link biasing member biasing the memory link, the lever member being held at an initial rotation position at which the lever member releases the lock member by a biasing force of the lever biasing member, the lever member rotating in a release direction from the initial rotation position against the biasing force of the lever biasing member in association with a forward folding of the seatback to press the lock member in a rotation direction where the restriction of the relative movement between the lower rail and the upper rail is released, the memory link being held at a separation position at which the memory link is inhibited from engaging with the stopper portion in a state to be restricted from rotating by the lever member that is arranged at the initial rotation position, the memory link being released from the lever member in a case where the lever member rotates in the release direction from the initial rotation position and rotating to an engageable position at which the memory link is engageable with the stopper portion by a biasing force of the memory link biasing member, the memory link at the engageable position being configured to pass through the stopper portion in a case where the upper rail moves to a front side of the seat, the memory link engaging with the stopper portion to restrict the upper rail from moving to a rear side of the seat in a case where the upper rail moves to the rear side of the seat after the memory link passes through the stopper portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a seat slide apparatus will be explained with reference to the attached drawings. In the following explanation, a front-rear direction corresponds to a front-rear direction of a vehicle. In addition, directions and orientations such as left, right, front, rear, top, and bottom correspond to those of the vehicle. The seat slide apparatus according to a first embodiment will be explained below.

Figure 26:
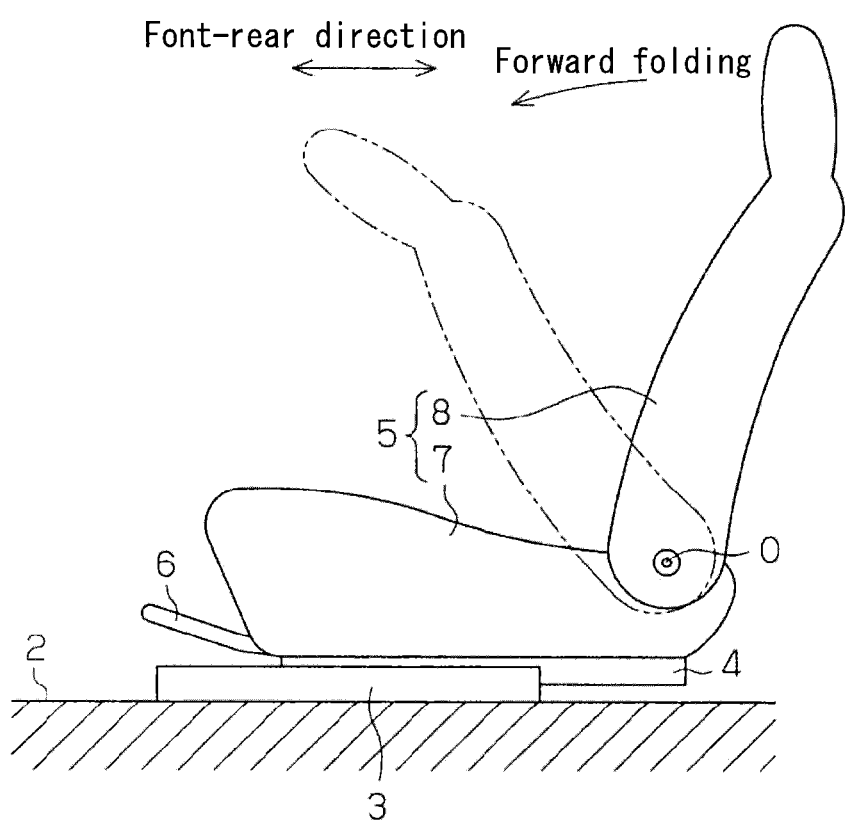
FIG. 26 is a side view illustrating a seat for a vehicle at which the seat slide apparatus according to the first and second embodiments is applied.
Figure 27A:
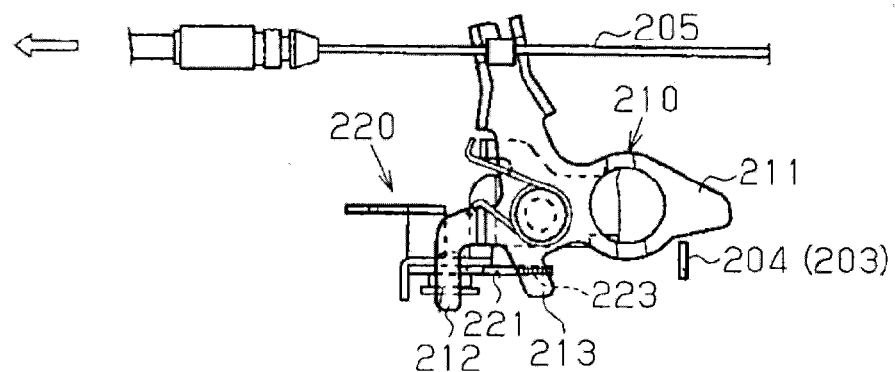
FIG. 27A is a plan view of a known seat slide apparatus for a vehicle.
Figure 27B:
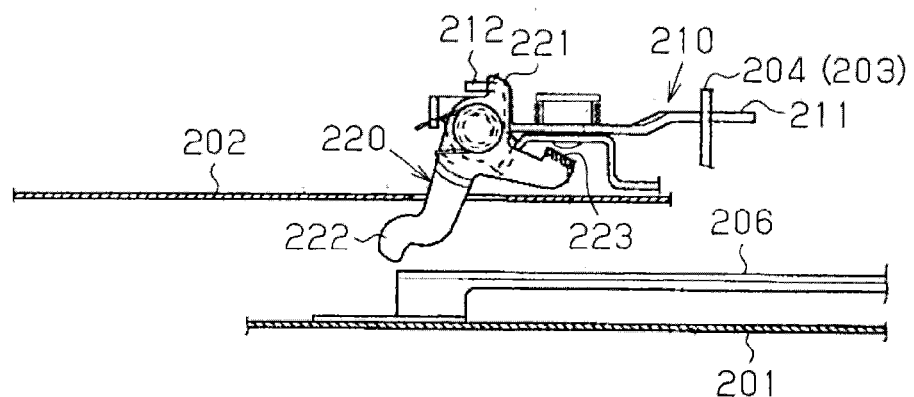
FIG. 27B is a longitudinal section view of the known seat slide apparatus.
Figure 27C:
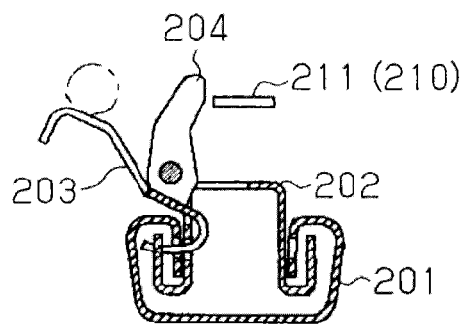
FIG. 27C is a cross-sectional view of the known seat slide apparatus.
Figure 28A:
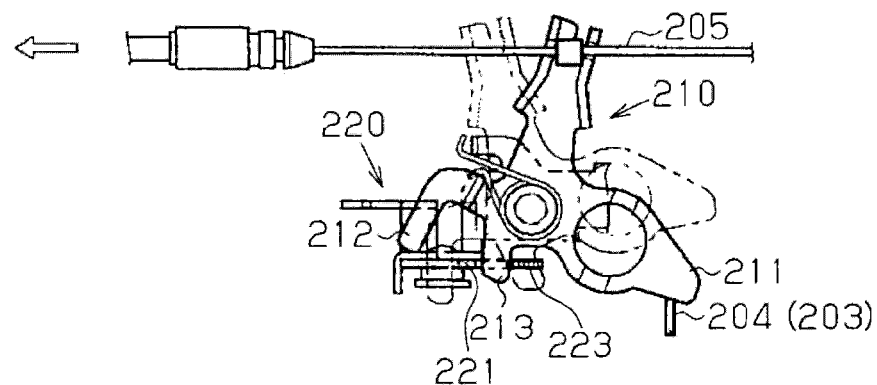
FIG. 28A is a plan view illustrating an operation of the known seat slide apparatus.
Figure 28B:
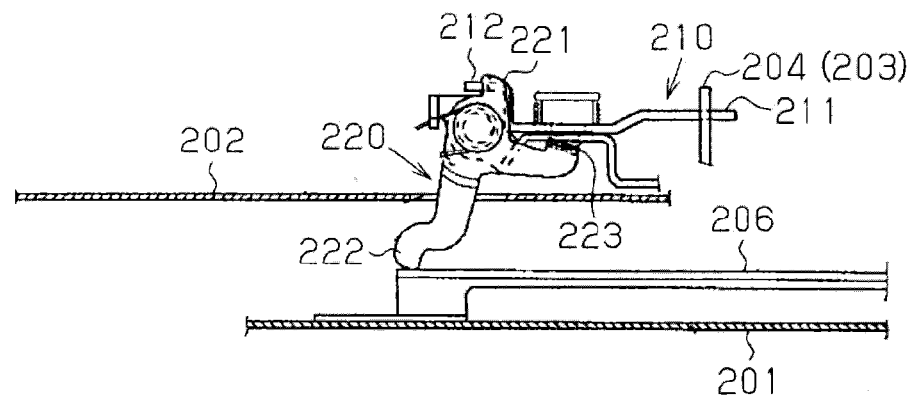
FIG. 28B is a longitudinal section view illustrating the operation of the known seat slide apparatus.
Figure 28C:
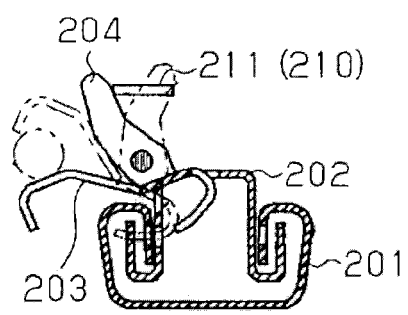
FIG. 28C is a cross-sectional view illustrating the operation of the known seat slide apparatus.

As illustrated in FIG. 26, a lower rail 3 is fixed (i.e., attached) to a vehicle floor 2 so as to extend in the front-rear direction. An upper rail 4 is attached to or mounted on the lower rail 3 so as to be movable relative to the lower rail 3 in the front-rear direction. In the present embodiment, a direction of a relative movement between the upper rail 4 and the lower rail 3 that corresponds to a long-side direction of each of the upper rail 4 and the lower rail 3 (a front-rear direction of a seat) coincides with the front-rear direction.

The lower rail 3 and the upper rail 4 in a pair (a first pair) and the lower rail 3 and the upper rail 4 in another pair (a second pair) are arranged to face each other in a width direction which corresponds to a direction orthogonal to a paper surface on which FIG. 26 is drawn. That is, the lower rail 3 and the upper rail 4 in the first pair are provided at a first side in the width direction while the lower rail 3 and the upper rail 4 in the second pair are provided at a second side in the width direction. In addition, the lower rails 3 serve as first and second lower rails while the upper rails 4 serve as first and second upper rails. In the following, first, the lower rail 3 and the upper rail 4 in the first pair arranged at the first side in the width direction, i.e., at a left side relative to a front side in the vehicle (i.e., a front side of a seat) is explained. A seat 5 is fixed and supported at both the upper rails 4 in the first pair and the second pair. The seat 5 includes a seat cushion 7 which forms a seating portion for an occupant and a seatback 8 supported at a rear end portion of the seat cushion 7 so as to be tiltable around a rotation axis O. The relative movement of the lower rails 3 and the upper rails 4 relative to each other is basically and normally in a locked state (restricted state). A release handle 6 for releasing the locked state is provided at the seat slide apparatus.

Figure 1:
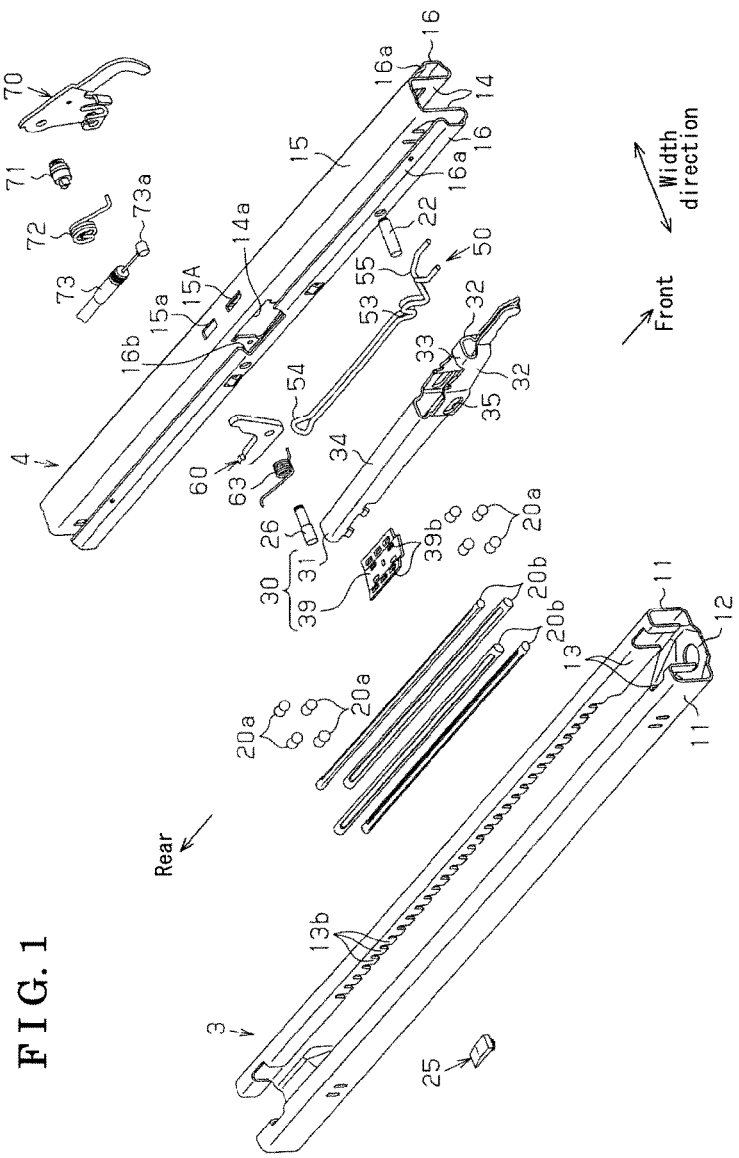
FIG. 1 is an exploded perspective view of a seat slide apparatus for a vehicle according to a first embodiment disclosed here.

As illustrated in FIG. 1, the lower rail 3 made of plate material includes a pair of first side wall portions 11 and a bottom wall portion 12. The first side wall portions 11 are provided at respective sides (i.e., opposed sides) of the lower rail 3 in the width direction so as to extend in an up-down direction. The first side wall portions 11 are arranged to face each other in the width direction. The bottom wall portion 12 connects base ends (that is, lower ends) of the respective first side wall portions 11 to each other. A first flange 13 is continuously formed at a distal end (that is, an upper end) of each of the first side wall portions 11. The first flange 13 which projects inwardly in the width direction is pulled back towards the base end of the corresponding first side wall portion 11.

Figure 2:
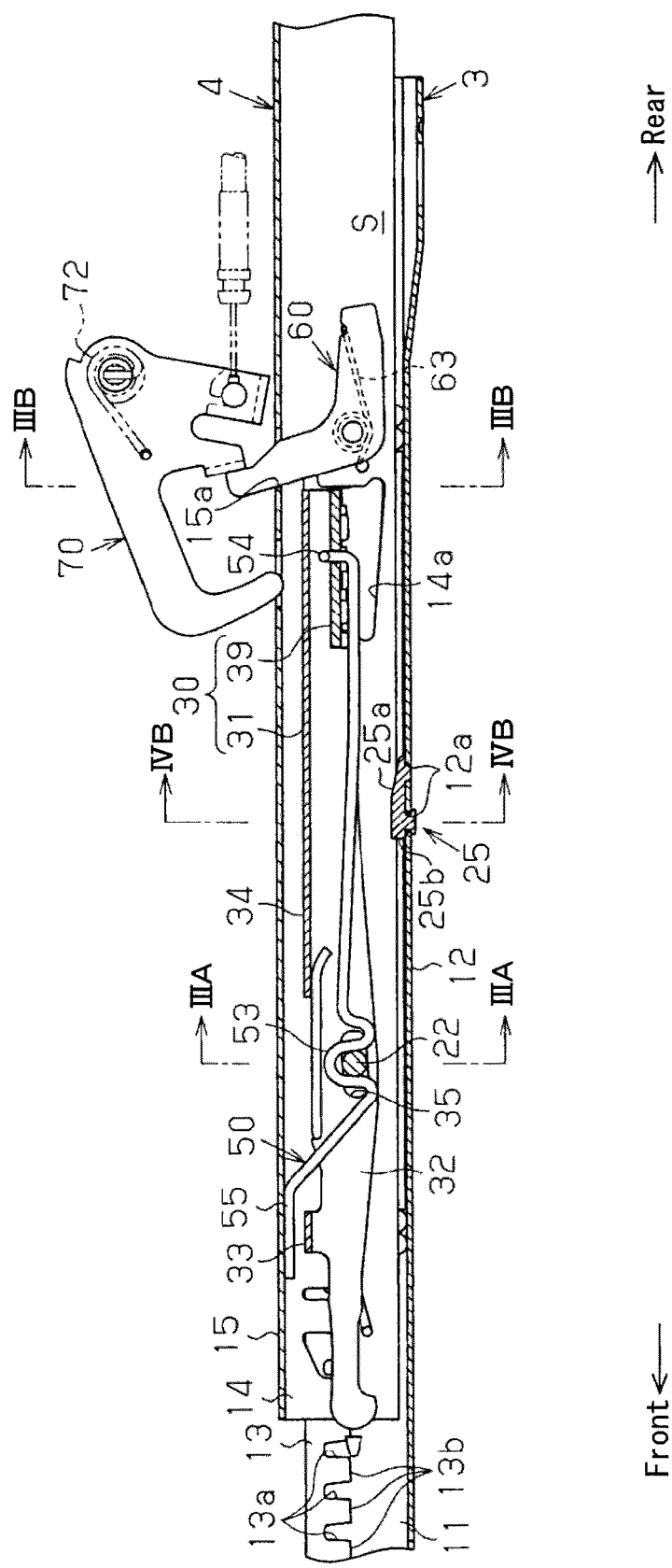
FIG. 2 is a longitudinal section view according to the first embodiment.

As illustrated in FIG. 2, plural cut-outs 13a are provided at a substantially intermediate portion of each of the first flanges 13 of the lower rail 3 in the long-side direction. The cut-outs 13a are formed upwardly from a distal end (that is, a lower end) of the first flange 13 and are spaced away from each other for a predetermined distance in the long-side direction. A locking protrusion 13b formed in a square-shaped tooth is provided between every adjacent cut-outs 13a. Thus, the plural locking protrusions 13b are arranged at the lower rail 3 along the long-side direction so as to be spaced away from each other by the predetermined distance.

Figure 3A:
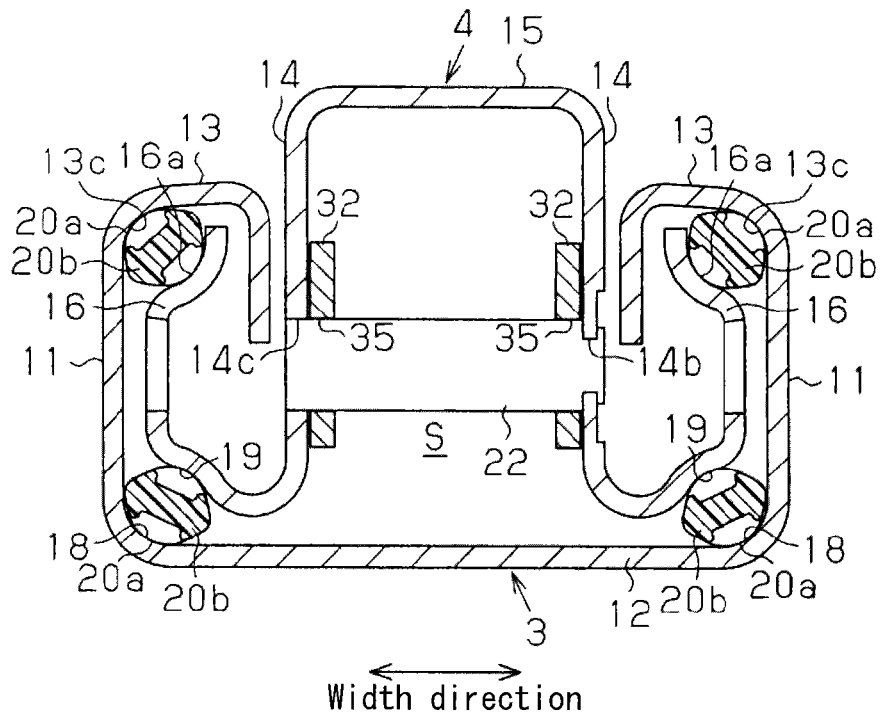
FIG. 3A is a cross-sectional view taken along line IIIA-IIIA in FIG. 2.

As illustrated in FIG. 3A, a contact portion between each of the first side wall portions 11 and the bottom wall portion 12 forms a first lower ball guide portion 18 that protrudes outward in the width direction and obliquely downward and that includes a substantially arc-shaped cross section. In addition, a contact portion between each of the first side wall portions 11 and each of the first flanges 13 forms a first upper ball guide portion 13c that protrude outward in the width direction and obliquely upward and that includes a substantially arc-shaped cross section.

The upper rail 4 which is made of plate material includes a pair of second side wall portions 14 and a cover wall portion 15. The pair of second side wall portions 14 is arranged to extend in the up-down direction between the first flanges 13 of the lower rail 3. The first second side wall portions 14 are arranged to face each other in the width direction. The cover wall portion 15 connects base ends (that is, upper ends) of the second side wall portions 14 to each other. A second flange 16 is continuously formed at a distal end (that is, a lower end) of each of the second side wall portions 14. The second flange 16 which projects outwardly in the width direction is pulled back so as to be surrounded by the corresponding first side wall portion 11 and the first flange 13.

That is, each of the lower rail 3 and the upper rail 4 includes a rail cross section formed substantially in a letter U in a state where opening sides of the cross sections of the lower rail 3 and the upper rail 4 face each other. The lower rail 3 and the upper rail 4 are prevented from coming off from each other in the up-down direction mainly by means of engagement of the first flanges 13 and the second flanges 16 with each other. A rail cross section formed by the lower rail 3 and the upper rail 4 is a so-called box shape including a rectangular shape. The lower rail 3, in cooperation with the upper rail 4, defines a void S.

As illustrated in FIG. 3A, a lower end portion of each of the second flanges 16 forms a second lower ball guide portion 19 that protrudes inward in the width direction and obliquely upward. In addition, an upper end portion of each of the second flanges 16 forms a second upper ball guide portion 16a that protrudes inward in the width direction and obliquely downward.

Plural balls 20a (rolling members), each of which is formed in a spherical body, are disposed between the second lower ball guide portions 19 and the first lower ball guide portions 18 which face the second lower ball guide portions 19 and between the second upper ball guide portions 16a and the first upper ball guide portions 13c which face the second upper ball guide portions 16a.

As illustrated in FIG. 1, the balls 20a are attached to holders 20b each of which is made of resin and which is arranged to extend in the front-rear direction (that is, a rail long-side direction). The balls 20a are arranged at a front end portion of each of the holders 20b as a pair and at a rear end portion of each of the holders 20b as a pair. That is, in this embodiment, for example, four of the balls 20a are arranged at each of the holders 20b. The upper rail 4 is supported at the lower rail 3 so as to be slidable in the long-side direction (that is, the front-rear direction) relative to the lower rail 3 in a manner that the balls 20a roll between the upper rail 4 and the lower rail 3.

First bores 14a each formed in a substantially square shape are formed at the respective second side wall portions 14 of the upper rail 4. Specifically, each of the first bores 14a is provided at a substantially intermediate portion, in the long-side direction, of the second side wall portion 14 of the upper rail 4. The first bores 14a are in communication with each other in the width direction. In addition, second bores 16b each formed in a substantially square shape are formed at the respective second flanges 16 of the upper rail 4. Specifically, each of the second bores 16b is provided at the upper end portion (that is, the second upper ball guide portion 16a) of the second flange 16 of the upper rail 4 so that the position of the second bore 16b matches the position of the corresponding first bore 14a in the long-side direction. The second bores 16b are in communication with each other in the width direction in a state to open upwardly.

As illustrated in FIG. 3A, first and second shaft attachment bores 14b and 14c are formed at the second side wall portions 14 respectively. The first and second shaft attachment bores 14b and 14c each of which includes a circular form are positioned at a front side of the first bores 14a and in communication with each other in the width direction. The first and second shaft attachment bores 14b and 14c are concentric circles relative to each other. An inner diameter of the first shaft attachment bore 14b is specified to be smaller than an inner diameter of the second shaft attachment bore 14c. Opposed ends (i.e., first and second ends) of a support shaft 22 in a column form are inserted to be positioned within the first and second shaft attachment bores 14b and 14c respectively so that the support shaft 22 is supported at both the second side wall portions 14. A center line (axis line) of the support shaft 22 extends in the width direction.

The first end of the support shaft 22 inserted to be positioned within the first shaft attachment bore 14b is fastened or secured to the corresponding second side wall portion 14. The second end of the support shaft 22 inserted to be positioned within the second shaft attachment bore 14c is connected to the corresponding second side wall portion 14 so as to be movable relative thereto in the width direction. Such configuration is provided to absorb, by the movement of the support shaft 22 in the width direction, a possible deformation of a cross-sectional shape of the upper rail 4 which may be caused by the arrangement of the balls 20a, for example, between the lower rail 3 and the upper rail 4. The first and second shaft attachment bores 14b and 14c (i.e., the support shaft 22) are arranged at a substantially center portion between the second lower ball guide portions 19 and the second upper ball guide portions 16a in the up-down direction, i.e., between a pair of sliding portions of the balls 20a at an upper side and a lower side. Such configuration is provided to minimize a possible deformation of each of the first and second shaft attachment bores 14b and 14c which may result from a possible deformation of the cross-sectional shape of the upper rail 4 in the aforementioned manner.

As illustrated in FIG. 1, a lock lever 30 serving as a lock member is connected to the inside of the upper rail 4 so as to be rotatable at the inner side of the second side wall portions 14 in the width direction by means of the support shaft 22. The lock lever 30 includes a stem portion 31 made of plate material extending in the front-rear direction. The stem portion 31 includes a pair of longitudinal wall portions 32 extending in the long-side direction of the stem portion 31 and arranged in a standing condition while facing each other in the width direction. A distance between the longitudinal wall portions 32 in the width direction is specified to be smaller than a distance between the second side wall portions 14 of the upper rail 4 in the width direction. At front end portions of the respective longitudinal wall portions 32, upper edges of the longitudinal wall portions 32 are connected to each other in the width direction via a connection wall 33. At rear end portions of the respective longitudinal wall portions 32, the upper edges of the longitudinal wall portions 32 are connected to each other in the width direction via a ceiling plate portion 34.

Elongated holes 35 are provided at the longitudinal wall portions 32 respectively. Each of the elongated holes 35 is formed to extend in the front-rear direction and is provided at a height position which is equivalent to a height position of the support shaft 22 (the first and second shaft attachment bores 14b and 14c). An opening width of the elongated hole 35 in a short-side direction (that is, the up-down direction) is specified to be equivalent to a diameter of the support shaft 22. The support shaft 22, of which first and second ends are inserted to be positioned within the first and second shaft attachment bores 14b and 14c, is inserted to be positioned within the elongated holes 35 in a state where the longitudinal wall portions 32 of the stem portion 31 are interposed between the second side wall portions 14 of the upper rail 4 in the width direction. Thus, the stem portion 31 is connected to the upper rail 4 so as to be rotatable in the up-down direction relative to the upper rail 4 in a state where the stem portion 31 is allowed to move in the front-rear direction in a range of the elongated hole 35.

Figure 3B:
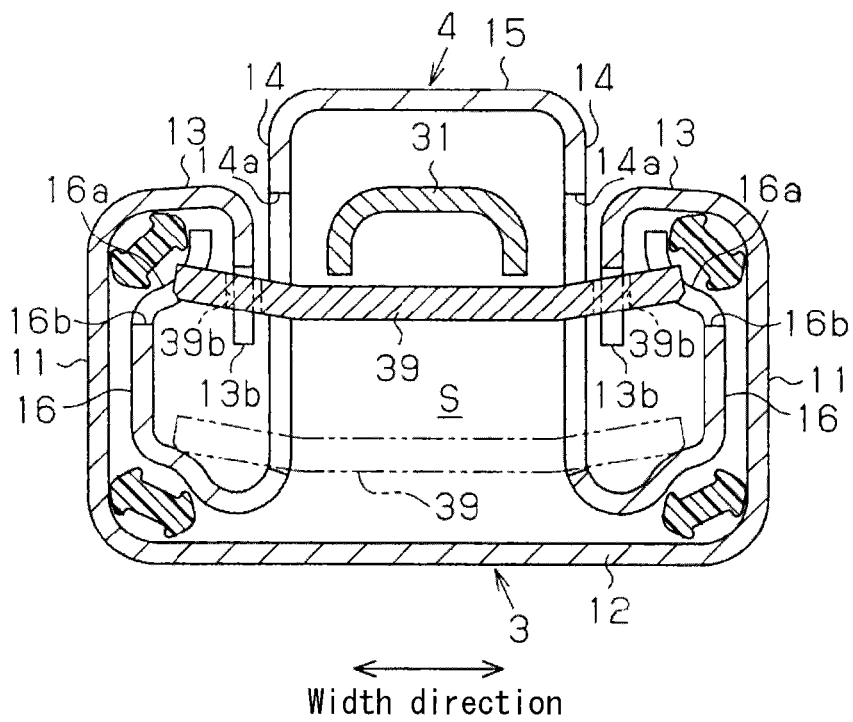
FIG. 3B is a cross-sectional view taken along line IIIB-IIIB in FIG. 2.

The lock lever 30 also includes a lock plate 39 made of plate material and fixed to a lower portion of a rear end portion of the stem portion 31. As illustrated in FIG. 3B, the lock plate 39 extends or spreads in the front-rear direction and in the width direction in a manner that the lock plate 39 passes or penetrates through the first bores 14a and the second bores 16b in the width direction. At the lock plate 39, locking holes 39b which open in the up-down direction are provided to face the respective and corresponding first flanges 13. Specifically, the plural (three) locking holes 39b are arranged side by side, i.e., to face one another, in the front-rear direction in a state where the predetermined distance is secured between the adjacent engagement holes 39a. The plural (three) locking holes 39b are formed at positions configured to match or conform to the plural (three) locking protrusions 13b adjacent to each other in the long-side direction of the lower rail 3.

As illustrated in FIG. 3B with solid lines, in a case where the lock lever 30 rotates about the support shaft 22 so that the lock plate 39 is lifted up, the corresponding locking protrusions 13b are engageable with the locking holes 39b. In a case where the locking protrusions 13b are in engagement with the locking holes 39b, the relative movement of the lower rail 3 and the upper rail 4 relative to each other is locked. On the other hand, as illustrated in FIG. 3B with double-dotted lines, in a case where the lock lever 30 rotates about the support shaft 22 so that the lock plate 39 is lowered, the locking holes 39b are specified to come out of, that is, to disengage from the corresponding locking protrusions 13b. At this time, the locking imposed on the relative movement of the lower rail 3 and the upper rail 4 with each other, that is, the state where the relative movement of the lower rail 3 and the upper rail 4 relative to each other is locked (locked state of the relative movement), is released.

A dimension (length) of the lock plate 39 in the width direction is specified to be greater than a length of distance in the width direction between the second upper ball guide portions 16a of the upper rail 4 and to be smaller than a length of distance in the width direction between lower portions of the second flanges 16 positioned lower than the second upper ball guide portions 16a. Accordingly, the lock plate 39 passes through the second bores 16b in the width direction in a state where the relative movement of the lower rail 3 and the upper rail 4 relative to each other is locked, however, the lock plate 39 does not interfere with the second flanges 16 in a state where the locking imposed on the relative movement of the lower rail 3 and the upper rail 4 relative to each other is released.

As illustrated in FIG. 1, a lock spring 50 made of a single wire rod is disposed within the upper rail 4. The lock spring 50 is formed in a substantially letter-U-shape which opens forward when viewed in a plan view. The lock spring 50 includes a wedge portion 53, a lever-side engagement end portion 54, and a rail-side engagement end portion 55. The wedge portion 53 is formed at a substantially intermediate portion of the lock spring 50 in the long-side direction thereof so as to protrude and curve upwardly. The lever-side engagement end portion 54 is formed at a rear end portion of the lock spring 50 in the long-side direction so as to bend upwardly. The rail-side engagement end portion 55 is formed at a front end portion of the lock spring 50 in the long-side direction. As also illustrated in FIG. 2, the lock spring 50 is assembled on the upper rail 4 in the following manner. The wedge portion 53 is fitted to the support shaft 22 from the upper side thereof so that the support shaft 22 is held at the wedge portion 53. The lever-side engagement end portion 54 is inserted to the lock plate 39 from the lower side so as to be fixed at the lock plate 39. In addition, the rail-side engagement end portion 55 is brought to make contact with the lower surface of the cover wall portion 15 of the upper rail 4. Consequently, the lock spring 50 is supported at the upper rail 4, and the like.

At this time, the lock spring 50 biases the lock lever 30, via the lever-side engagement end portion 54, to rotate in a direction where the lock plate 39 is lifted up, i.e., where the locking holes 39b engage with the corresponding locking protrusions 13b by the insertion thereof to the locking holes 39b. By means of a reaction force generated by the aforementioned operation, the lock spring 50 also biases the support shaft 22, via the wedge portion 53, in a downward direction, i.e., in a direction orthogonal to the long-side direction of each of the elongated holes 35, so as to inhibit the support shaft 22 from moving in the front-rear direction within the elongated holes 35. Thus, the position of the support shaft 22 in the front-rear direction within the elongated holes 35 is biased and held or maintained by the wedge portion 53 of the lock spring 50.

The release handle 6 is made of pipe material or tube material by means of bending and forming. The release handle 6 is inserted into the upper rail 4 from a front opening end thereof and then a front end portion of the stem portion 31 of the lock lever 30 is inserted into the release handle 6 so that the release handle 6 is connected to the lock lever 30. Therefore, the release handle 6 basically rotates together with the lock lever 30 around the support shaft 22. In a case where a front end of the release handle 6 is lifted up, the lock lever 30 rotates together with the release handle 6 around the support shaft 22 against a biasing force of the lock spring 50 in a direction where the lock plate 39 is lowered, i.e., where the locking holes 39b disengage from the locking protrusions 13b.

In a state where an operation force of the release handle 6 is not generated, the biasing force of the lock spring 50 causes the lock lever 30 to rotate together with the release handle 6 around the support shaft 22 in the direction where the lock plate 39 is lifted up, i.e., where the locking holes 39b engage with the corresponding locking protrusions 13b (the locking protrusions 13b are inserted to the locking holes 39b). Thus, the relative movement between the lower rail 3 and the upper rail 4 is locked or restricted. The position of the seat 5 that is supported by the upper rails 4 is held and retained accordingly.

In a case where the release handle 6 is thereafter operated so that the front end thereof is lifted up, the lock lever 30 rotates together with the release handle 6 around the support shaft 22 in the direction where the lock plate 39 is lowered, i.e., where the locking holes 39b disengage from the locking protrusions 13b, against the biasing force of the lock spring 50. Thus, the locking of the relative movement between the lower rail 3 and the upper rail 4 is released. The position of the seat 5 that is supported by the upper rails 4 is adjustable in the front-rear direction accordingly.

Peripheral configurations of one of the lower rails 3 in the first pair, and the like, provided at one side (the first side) of the seat 5 in the width direction will be explained. As illustrated in FIGS. 2 and 4B, a pair of circular attachment bores 12a is provided at a substantially center portion of the bottom wall portion 12 of the lower rail 3 in the long-side direction and in the width direction. The attachment bores 12a are arranged at the bottom wall portion 12 to face each other in the front-rear direction. A stopper portion 25 is placed onto the bottom wall portion 12 while engaging with both the attachment bores 12a. The stopper portion 25 is disposed at a substantially center portion of the bottom wall portion 12 in the width direction. The stopper portion 25 includes a width (length) being smaller than a length of distance defined between the second side wall portions 14 of the upper rail 4. An upper surface of the stopper portion 25 forms a guide surface 25a serving as an inclined surface inclined upwardly from the bottom wall portion 12 in a direction towards a front end of the vehicle from a rear end of the stopper portion 25. A front end surface of the stopper portion 25 forms an engagement surface 25b in a stepped form that rises substantially vertically from the bottom wall portion 12.

Figure 4A:
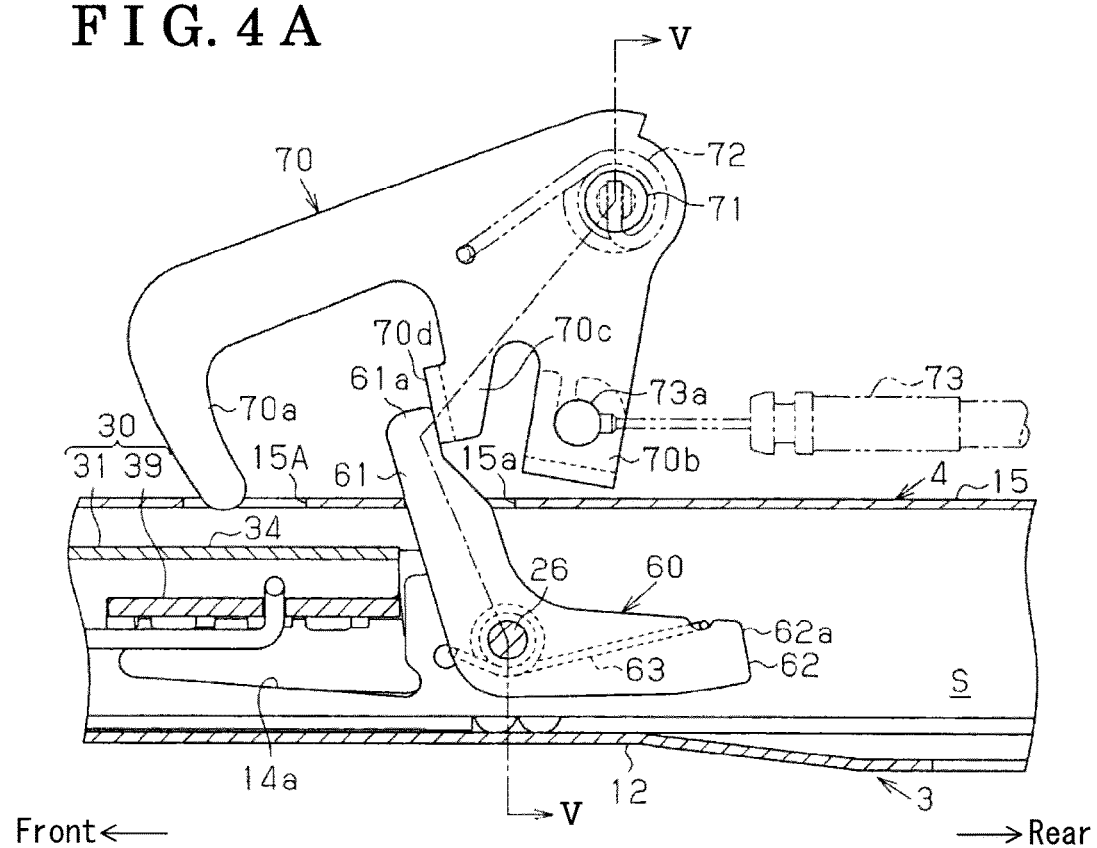
FIG. 4A is a longitudinal section view illustrating a locked state of a relative movement of an upper rail relative to a lower rail according to the first embodiment.
Figure 4B:
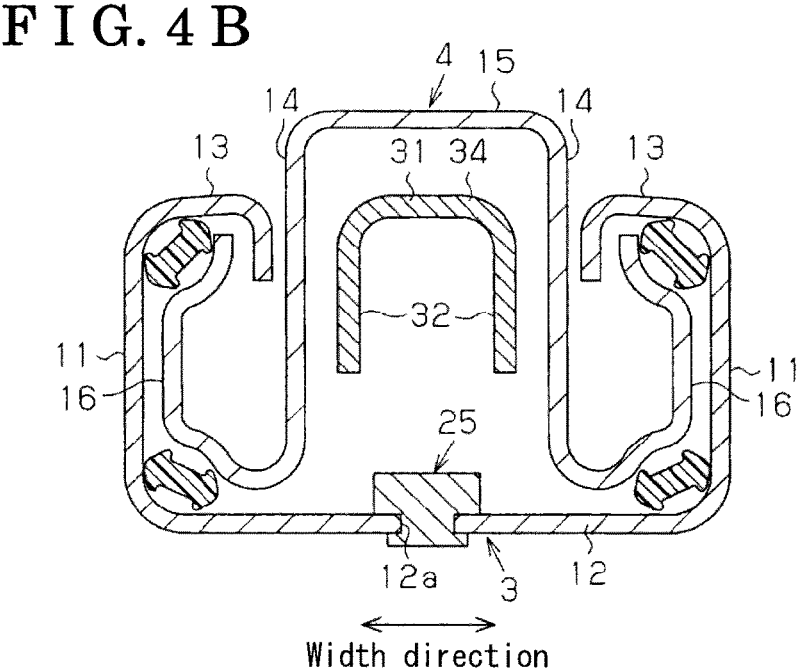
FIG. 4B is a cross-sectional view taken along line IVB-IVB in FIG. 2.
Figure 5:
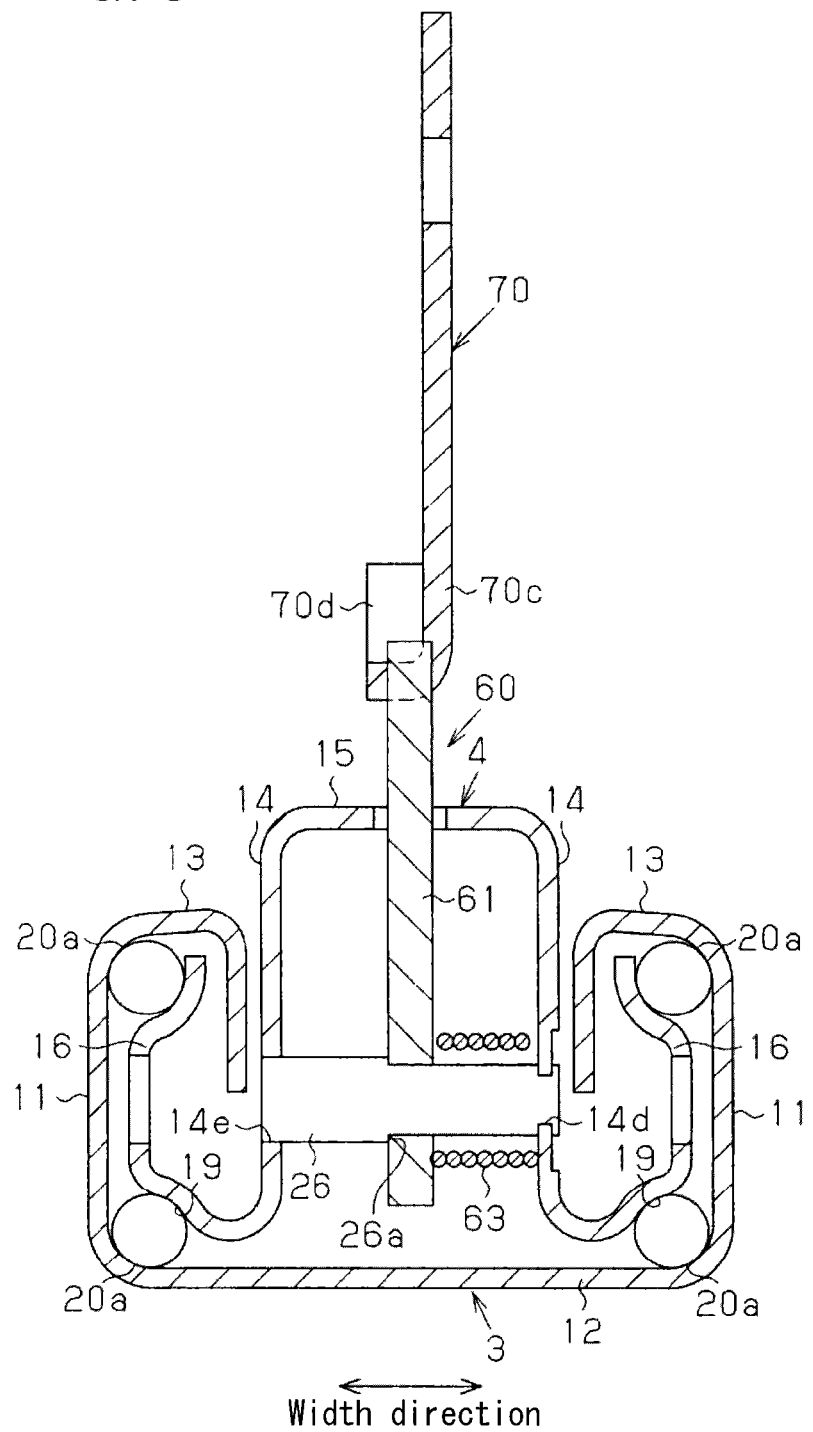
FIG. 5 is a cross-sectional view taken along line V-V in FIG. 4A.

As illustrated in FIGS. 4A and 5, a memory link 60 is connected to the upper rail 4 so as to be rotatable thereto. The memory link 60 is made of plate material, for example, and is positioned at a rear side of the lock lever 30 in the vehicle. In addition, the memory link 60 is disposed at a center portion between the pair of second side wall portions 14 of the upper rail 4 in the width direction. Third and fourth shaft attachment bores 14d and 14e are formed at the second side wall portions 14 respectively. The third and fourth shaft attachment bores 14d and 14e each of which includes a circular form are positioned at a rear side of the first bores 14a and in communication with each other in the width direction. The third and fourth shaft attachment bores 14d and 14e are concentric circles relative to each other. An inner diameter of the third shaft attachment bore 14d is specified to be smaller than an inner diameter of the fourth shaft attachment bore 14e. A fixation pin 26 in a stepped column form is supported at the second side wall portions 14 in a state where opposed ends (i.e., first and second ends) of the fixation pin 26 are inserted to be positioned within the third and fourth shaft attachment bores 14d and 14e respectively. A center line (axis line) of the fixation pin 26 extends in the width direction. A portion of the fixation pin 26 facing the fourth shaft attachment bore 14e expands in a radial direction via a stepped portion 26a that is formed at a substantially center portion of the fixation pin 26 in the long-side direction thereof.

The first end of the fixation pin 26 inserted to be positioned within the third shaft attachment bore 14d is fastened or secured to the corresponding second side wall portion 14. The second end of the fixation pin 26 inserted to be positioned within the fourth shaft attachment bore 14e is connected to the corresponding second side wall portion 14 so as to be movable relative thereto in the width direction. Such configuration is provided to absorb, by the movement of the fixation pin 26 in the width direction, a possible deformation of the cross-sectional shape of the upper rail 4 which may be caused by the arrangement of the balls 20a, for example, between the lower rail 3 and the upper rail 4. The third and fourth shaft attachment bores 14d and 14e (i.e., the fixation pin 26) are arranged at a substantially center portion between the second lower ball guide portions 19 and the second upper ball guide portions 16a in the up-down direction, i.e., between the pair of sliding portions of the balls 20a at the upper side and the lower side. Such configuration is provided to restrain a possible deformation of each of the third and fourth shaft attachment bores 14d and 14e which may result from a possible deformation of the cross-sectional shape of the upper rail 4 as mentioned above.

The memory link 60 is supported at the fixation pin 26 so as to be rotatable thereto in a state where the movement of the memory link 60 in the width direction, specifically, in a direction towards the fourth shaft attachment bore 14e, is restricted by the stepped portion 26a. The memory link 60 is formed substantially in a letter L including a pair of lever projections 61 and 62. The lever projections 61 and 62 radially extend from the fixation pin 26 in an upward direction and a rearward direction respectively. A hole 15a is formed at the cover wall portion 15 of the upper rail 4 so that the lever projection 61 that extends upward is insertable to the hole 15a. Accordingly, a distal end (i.e., an upper end) of the lever projection 61 projects upward from the cover wall portion 15 by passing through or penetrating through the hole 15a. The memory link 60 is allowed to rotate about the fixation pin 26 at the hole 15a within a range of a clearance that is defined between the lever projection 61 and the hole 15a in the front-rear direction. Specifically, the rotation of the memory link 60 around the fixation pin 26 is limited between a state at which the lever projection 61 is in contact with a front-side inner wall surface of the hole 15a and a state at which the lever projection 61 is in contact with a rear-side inner wall surface of the hole 15a. The distal end of the lever projection 61 that projects from the hole 15a forms or includes an engagement portion 61a. A rear end surface of the lever projection 62 that extends substantially vertically forms or includes a link-side engagement surface 62a.

As illustrated in FIGS. 4A and 5, a memory link biasing member 63 formed by a torsion spring, for example, is wound around a portion of the fixation pin 26 between the memory link 60 and one of the second side wall portions 14 at which the third shaft attachment bore 14d is formed. One end of the memory link biasing member 63 engages with the aforementioned second side wall portion 14 while the other end of the memory link biasing member 63 engages with the lever projection 62. The memory link biasing member 63 biases the memory link 60 to rotate in a direction in which the lever projection 61 makes contact with the rear-side inner wall surface of the hole 15a, i.e., in a rotation direction corresponding to a clockwise direction in FIG. 4A.

An insertion bore 15A substantially in a square form is formed at the cover wall portion 15 of the upper rail 4. The insertion bore 15A penetrates through in the up-down direction and faces a rear end portion of the lock lever 30, specifically, of the stem portion 31. A first bell crank link 70 serving as a lever member is connected via an appropriate bracket to an upper portion of the upper rail 4 in the vicinity of the memory link 60, for example. The first bell crank link 70 is rotatable around a support shaft 71 of which an axis line extends in the width direction. The first bell crank link 70 that is made of plate material includes a pressing portion 70a formed substantially in a letter L, an attachment portion 70b formed substantially in a letter l, and an engagement portion 70c. The pressing portion 70a radially extends from the support shaft 71 in an obliquely downward and forward direction. The attachment portion 70b radially extends from the support shaft 71 in a downward direction. The engagement portion 70c extends in the downward direction between the pressing portion 70a and the attachment portion 70b. A distal end of the engagement portion 70c is bent in the width direction to form or include an engagement body 70d.

A distal end portion of the pressing portion 70a that is bent in an obliquely downward and rearward direction faces the insertion bore 15A in a counterclockwise direction in FIG. 4A relative to the support shaft 71. A rotation locus or passage of the distal end portion of the pressing portion 70a in the counterclockwise direction is secured by the insertion bore 15A. Accordingly, in a case where the first bell crank link 70 rotates in the counterclockwise direction relative to the support shaft 71 which corresponds to a release direction, i.e., the first bell crank link 70 is shifted from a state illustrated in FIG. 4A to a state illustrated in FIG. 7, the lock lever 30 that is pressed by the distal end portion of the pressing portion 70a which passes through the insertion bore 15A rotates about the support shaft 22 against the biasing force of the lock spring 50 in the direction where the lock plate 39 is lowered, i.e., where the locking holes 39b disengage from the respective locking protrusions 13b.

A first lever biasing member 72 formed by a torsion spring, for example, is wound around the support shaft 71. One end of the first lever biasing member 72 engages with the first bell crank link 70 while the other end of the first lever biasing member 72 engages with the support shaft 71 so that the first bell crank link 70 is biased in the clockwise direction in FIGS. 4A and 7. The first bell crank link 70 is configured to be held at an initial rotation position by the biasing force of the first lever biasing member 72 so that the lock lever 30 is released from the first bell crank link 70 as illustrated in FIG. 4A.

Specifically, the first bell crank link 70 that is biased to rotate by the first lever biasing member 72 is configured so that the engagement body 70d makes contact with the engagement portion 61a of the memory link 60. The lever projection 61 of the memory link 60 makes contact with the front-side inner wall surface of the hole 15a so that the rotation of the memory link 60 is restricted or blocked. The rotation of the first bell crank link 70 is restricted via the memory link 60 accordingly. The rotation position of the first bell crank link 70 at this time corresponds to the initial rotation position.

The biasing force of the first lever biasing member 72 for holding or maintaining the first bell crank link 70 at the initial rotation position is specified to be greater than the biasing force of the memory link biasing member 63 for rotating the memory link 60 from a separation position which will be explained later.

The memory link 60 which is inhibited from rotating by the first bell crank link 70 arranged at the initial rotation position is held or retained at a rotation position at which the lever projection 62 is relatively greatly away from the bottom wall portion 12, for example, as illustrated in FIG. 4A. Such rotation position of the memory link 60 corresponds to the separation position. At this time, a lowest end portion of the lever projection 62 (specifically, of the link-side engagement surface 62a) is positioned upper than a highest end portion of the stopper portion 25 (specifically, of the engagement surface 25b) in the up-down direction. In addition, the lowest end portion of the lever projection 62, i.e., of the memory link 60 engageable with the stopper portion 25 is positioned at a lower side and at the rear side of the seat 5 relative to a rotation center of the memory link 60.

A first end 73a of a release cable 73 engages with the attachment portion 70b of the first bell crank link 70. The release cable 73 extends rearward in the vehicle from the attachment portion 70b. A second end of the release cable 73 is connected to the seatback 8. In a state where the seatback 8 is tilted forward from a seating state, i.e., the seatback 8 is in a forward folded state, the attachment portion 70b of the first bell crank link 70 is pulled rearward via the release cable 73 so that the first bell crank link 70 rotates about the support shaft 71 in the counterclockwise direction in FIG. 4A corresponding to the release direction against the biasing force of the first lever biasing member 72. At this time, as mentioned above, the lock lever 30 that is pressed by the distal end portion of the pressing portion 70a rotates around the support shaft 22 against the biasing force of the lock spring 50 in a direction where the lock plate 39 is lowered, i.e., where the locking holes 39b disengage from the corresponding locking protrusions 13b.

Figure 7:
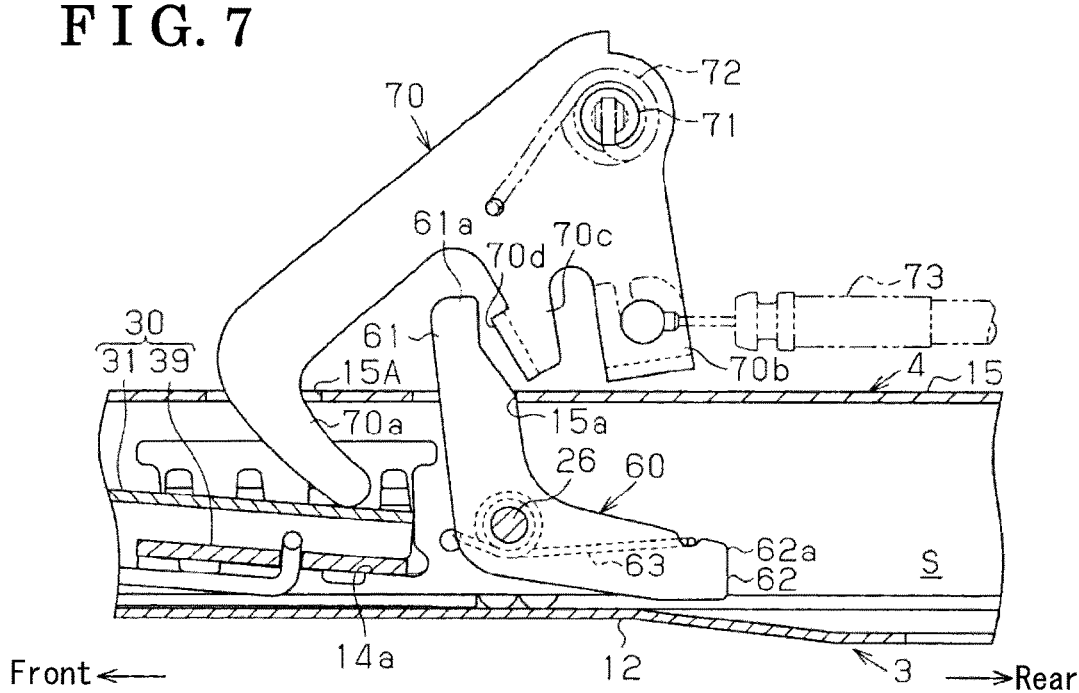
FIG. 7 is a longitudinal section view illustrating the released state of the locking of the relative movement of the upper rail relative to the lower rail in association with a forward folding of a seatback according to the first embodiment.

As illustrated in FIG. 7, in a state where the first bell crank link 70 rotates in the release direction, the engagement portion 61a of the memory link 60 disengages from the engagement body 70d. Thus, the memory link 60 that is biased by the memory link biasing member 63 rotates in the clockwise direction in FIG. 7 until the lever projection 61 makes contact with the rear-side inner wall surface of the hole 15a. As a result, the memory link 60 is held or retained at a rotation position at which the lever projection 62 is relatively slightly away from the bottom wall portion 12, for example. Such rotation position of the memory link 60 corresponds to an engageable position. At this time, the lowest end portion of the lever projection 62 (specifically, of the link-side engagement surface 62a) is positioned lower than the highest end portion of the stopper portion 25 (specifically, of the engagement surface 25b) in the up-down direction.

FIG. 4A illustrates the state in which the seatback 8 is not folded forward so that the first bell crank link 70 is held at the initial rotation position by the biasing force of the first lever biasing member 72 for releasing the lock lever 30, and the memory link 60 is held at the separation position against the biasing force of the memory link biasing member 63. In addition, in FIG. 4A, the operation force of the release handle 6 is not generated so that the relative movement between the lower rail 3 and the upper rail 4 is locked, i.e., restricted.

Figure 6:
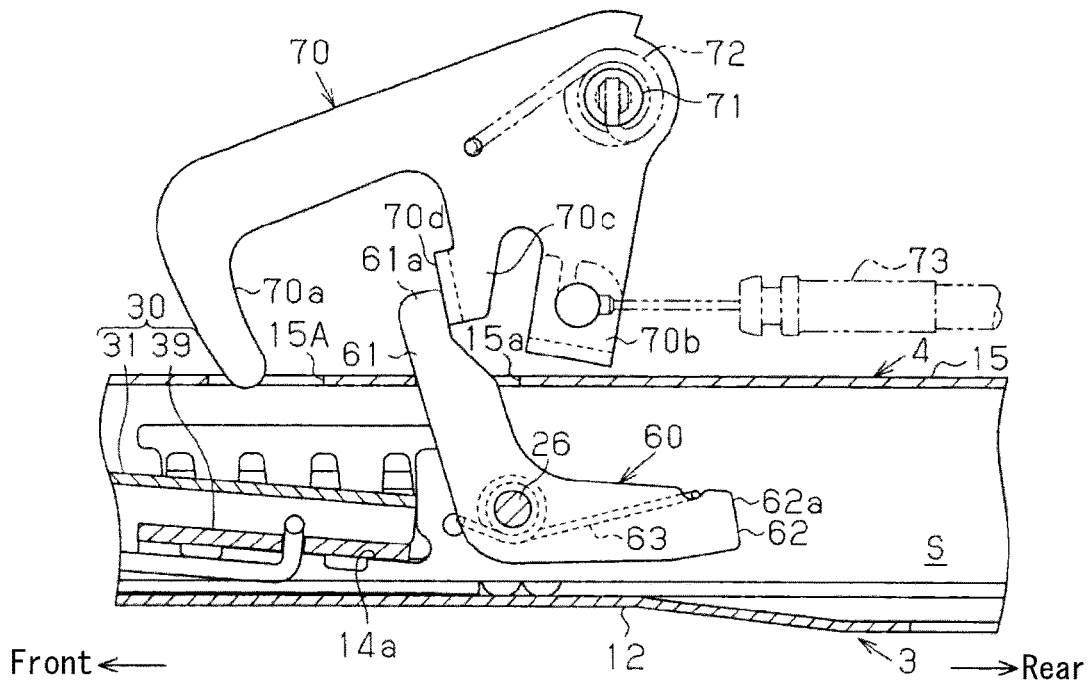
FIG. 6 is a longitudinal section view illustrating a released state of the locking of the relative movement of the upper rail relative to the lower rail in association with an operation of a release handle according to the first embodiment.

In the aforementioned state in FIG. 4A, in a case where the release handle 6 is operated as illustrated in FIG. 6, the lock lever 30 rotates around the support shaft 22 against the biasing force of the lock spring 50 in the direction where the lock plate 39 is lowered to thereby release the locking of the relative movement between the lower rail 3 and the upper rail 4. At this time, the first bell crank link 70 is maintained and held at the initial rotation position while the memory link 60 is maintained and held at the separation position. Therefore, at this time, in a case where the upper rail 4 moves in the front-rear direction, the memory link 60 (specifically, the lever projection 62) is inhibited from interfering or contacting with the stopper portion 25.

In a case where the seatback 8 is folded forward as illustrated in FIG. 7 from the state in FIG. 4A, the first bell crank link 70 rotates in the release direction. Then, the lock lever 30 that is pressed by the first bell crank link 70 (specifically, the distal end portion of the pressing portion 70a) rotates about the support shaft 22 against the biasing force of the lock spring 50 in the direction where the lock plate 39 is lowered, thereby releasing the locking of the relative movement of the lower rail 3 and the upper rail 4.

At this time, because the engagement portion 61a of the memory link 60 disengages from the engagement body 70d of the first bell crank link 70, the memory link 60 rotates in the clockwise direction around the fixation pin 26 by the biasing force of the memory link biasing member 63 until the lever projection 61 makes contact with the rear-side wall surface of the hole 15a. Then, the memory link 60 is held at the engageable position. At this time, in a case where the memory link 60 (specifically, the link-side engagement surface 62a) is positioned in the rear of the stopper portion 25 (specifically, the engagement surface 25b), the upper rail 4 is movable relative to the lower rail 3 in the front-rear direction.

As long as the seatback 8 is in the forward folded state, the lock lever 30 is maintained to be pressed by the pressing portion 70a of the first bell crank link 70 so that the released state of the locking of the relative movement between the lower rail 3 and the upper rail 4 is maintained. That is, in the forward folded state of the seatback 8, the upper rail 4 (the seat 5) is allowed to move forward until the movement thereof is restricted by a known stopper mechanism (i.e., a so-called walk-in operation).

Figure 8:
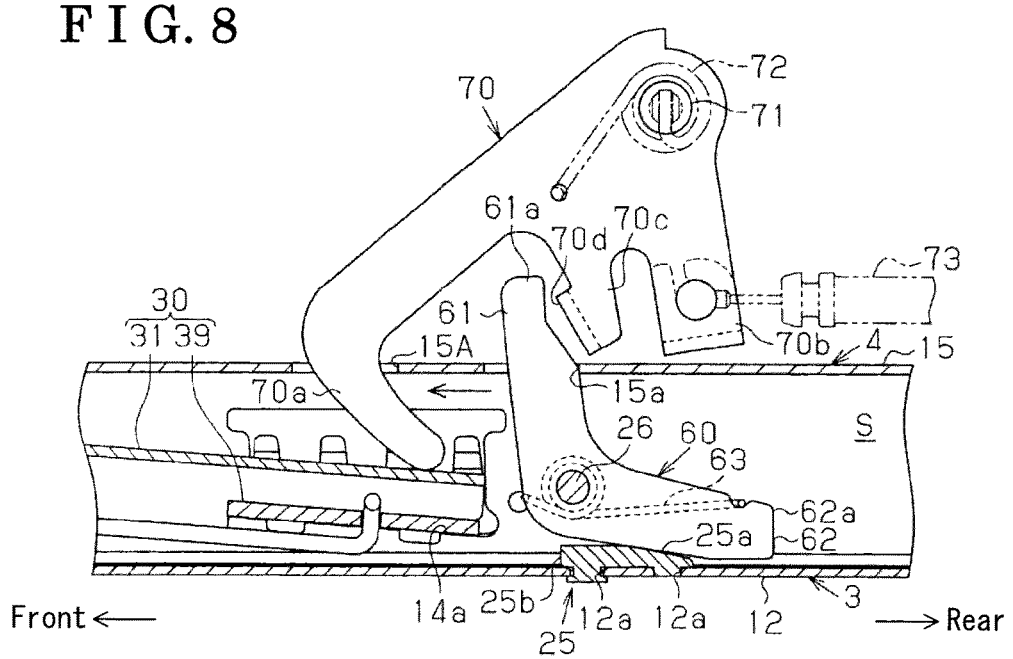
FIG. 8 is a longitudinal section view illustrating a state where a memory link that moves forward after the forward folding of the seatback is passing through a stopper portion according to the first embodiment.
Figure 9:
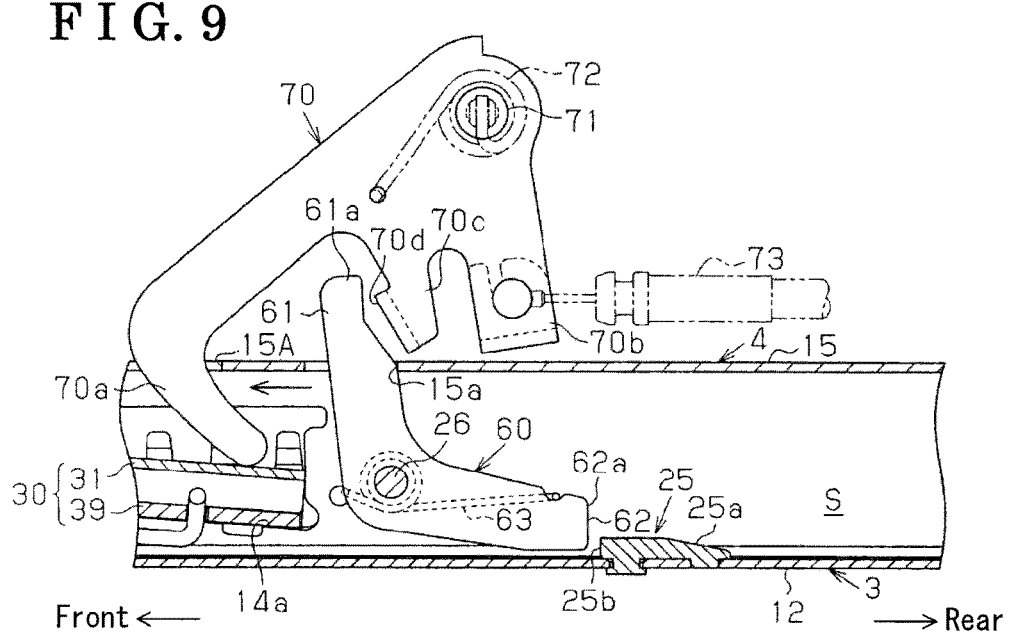
FIG. 9 is a longitudinal section view illustrating a state where the memory link that moves forward after the forward folding of the seatback has passed through the stopper portion according to the first embodiment.

Specifically, as illustrated in FIG. 8, in a case where the memory link 60 reaches the stopper portion 25 in association with the forward movement of the upper rail 4 relative to the lower rail 3, a lower surface of the lever projection 62 is guided by the guide surface 25a of the stopper portion 25. Then, as illustrated in FIG. 9, the memory link 60 passes through and moves beyond, i.e., overrides, the stopper portion 25 while swinging or vibrating against the biasing force of the memory link biasing member 63.

Figure 10:
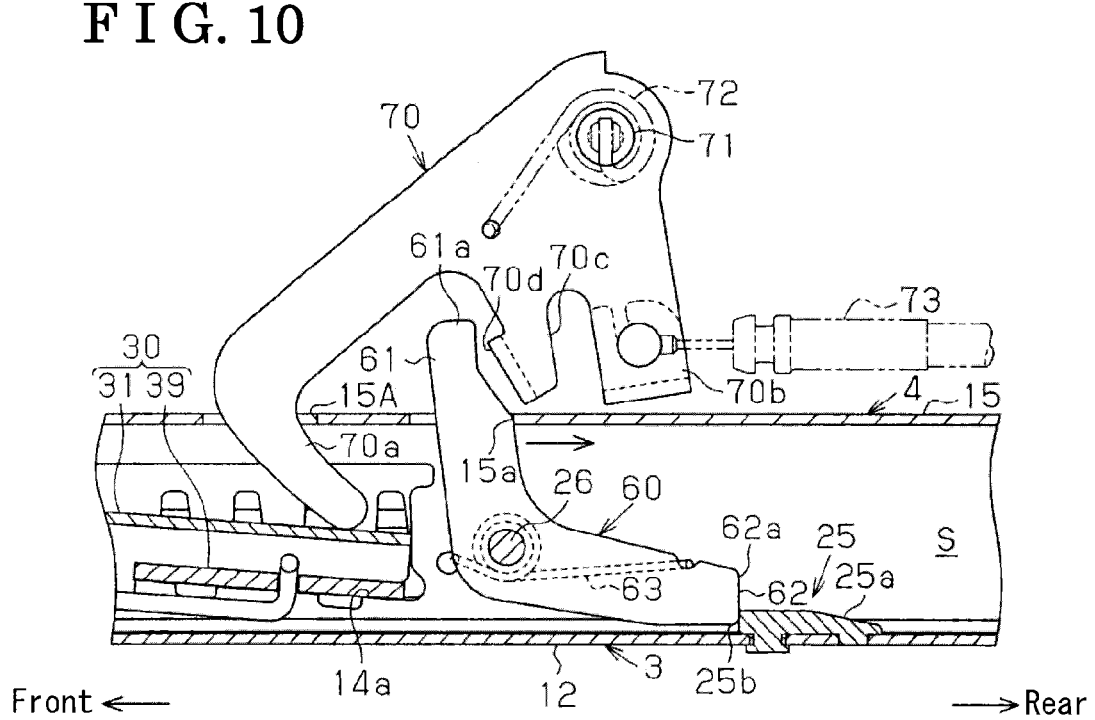
FIG. 10 is a longitudinal section view illustrating a state where the memory link that moves rearward after passing through the stopper portion engages with the stopper portion according to the first embodiment.

On the other hand, as illustrated in FIG. 10, in a case where the memory link 60, after passing through the stopper portion 25, reaches the stopper portion 25 in association with the subsequent rearward movement of the upper rail 4 relative to the lower rail 3, the memory link 60 in the engageable position is inhibited from moving in the rearward direction by the contact of the link-side engagement surface 62a of the lever projection 62 with the engagement surface 25b of the stopper portion 25. The lower rail 3 and the upper rail 4 return to a relative position at which the memory link 60 (specifically, the link-side engagement surface 62a) is in contact with the stopper portion 25 (specifically, the engagement surface 25b). Such relative position corresponds to a neutral position. The neutral position is specified on a basis of the relative position between the lower rail 3 and the upper rail 4, which may be mostly obtained or applied in a case where an ordinary occupant is seated in the seat.

In a case where the memory link 60 makes contact with the stopper portion 25 at the time of the rearward movement of the upper rail 4, and the like, a pressing force is applied to the memory link 60 so as to rotate the memory link 60 around the fixation pin 26 in the clockwise direction. Nevertheless, because the rotation of the memory link 60 in the engageable position is restricted by the upper rail 4 (specifically, by the hole 15a), the memory link 60 is inhibited from rotating.

Afterwards, in a case where the seatback 8 is pulled back so as to release the forward folded state thereof, the first bell crank link 70 returns to the initial rotation position as illustrated in FIG. 4A by rotating about the support shaft 71 in the counterclockwise direction in FIG. 10. In addition, the memory link 60 returns to the separation position as illustrated in FIG. 4A by rotating about the fixation pin 26 in the counterclockwise direction in FIG. 10.

In association with the aforementioned operation, the lock lever 30 is released from the first bell crank link 70 (specifically, the distal end portion of the pressing portion 70a) to lock the relative movement of the lower rail 3 and the upper rail 4. Accordingly, in a case where the upper rail 4 moves forward in the vehicle (i.e., moves to the front side of the seat 5) in association with the forward folding of the seatback 8 and thereafter moves rearward, the relative position between the lower rail 3 and the upper rail 4 returns to the neutral position after the forward folded state of the seatback 8 is released.

Figure 11A:
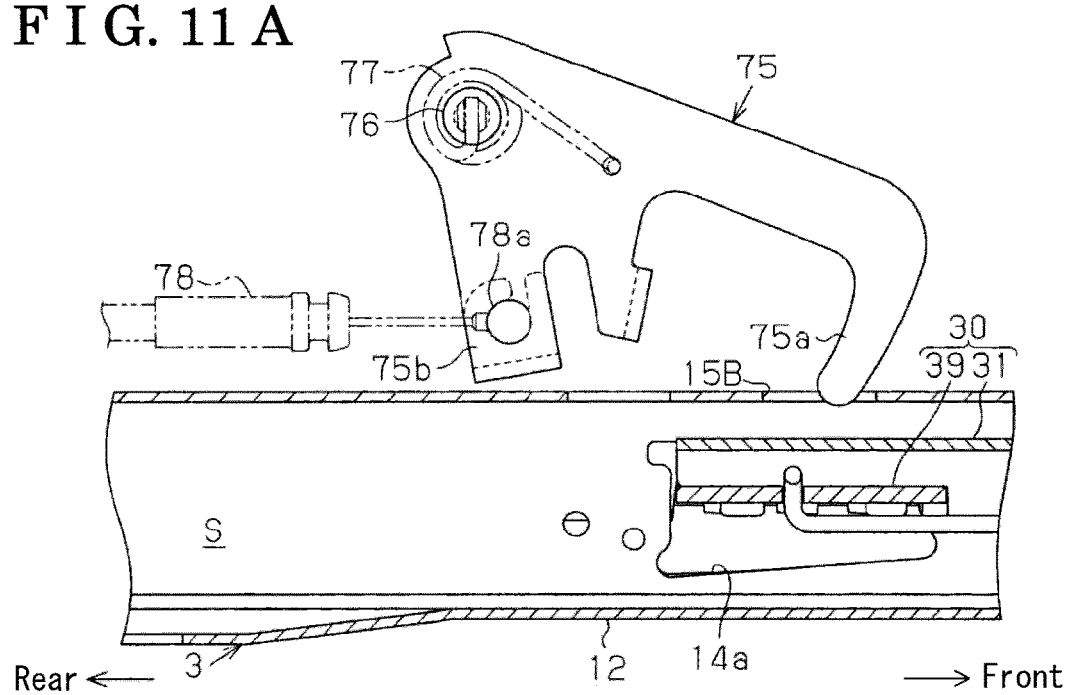
FIG. 11A is a longitudinal section view illustrating the locked state of the relative movement of the upper rail relative to the lower rail according to the first embodiment.
Figure 11B:
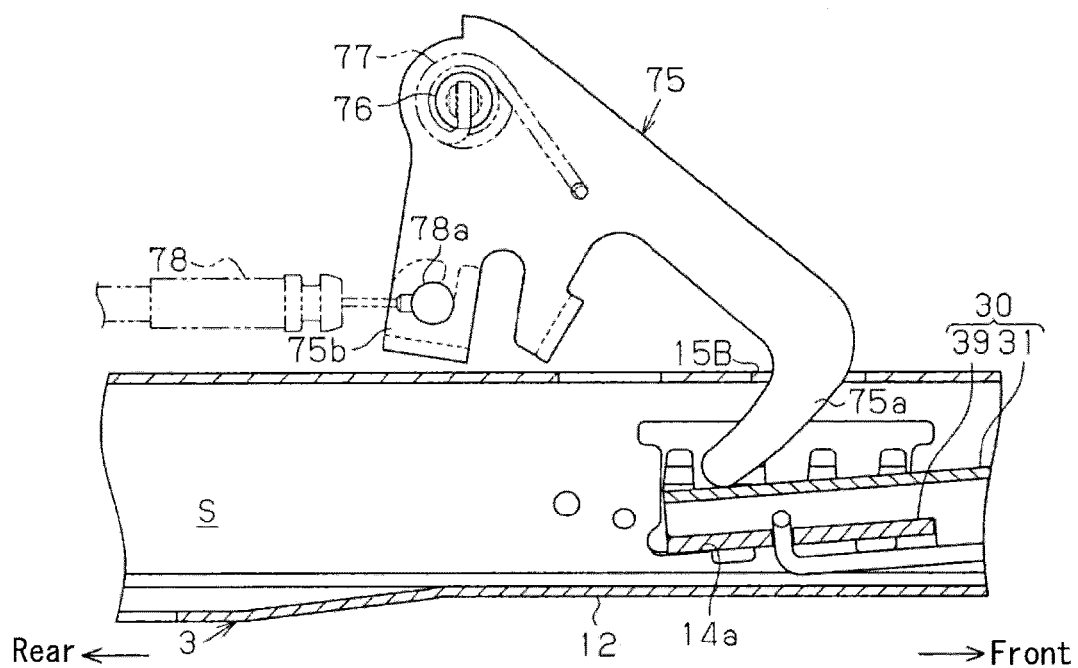
FIG. 11B is a longitudinal section view illustrating the released state of the locking of the relative movement of the upper rail relative to the lower rail.

Peripheral configurations of the other of the lower rails 3 in the second pair, and the like, provided at the other side (the second side) of the seat 5 in the width direction will be explained. As illustrated in FIGS. 11A and 11B, the stopper portion 25 is not provided at the lower rail 3 in the second pair at the second side in the width direction. In addition, the memory link 60 is not provided at the upper rail 4 in the second pair at the second side in the width direction. An insertion bore 15B substantially in a square form is formed at the cover wall portion 15 of the upper rail 4. The insertion bore 15B penetrates through in the up-down direction and faces the rear end portion of the lock lever 30. A second bell crank link 75 serving as a second lever member is connected via an appropriate bracket to an upper portion of the upper rail 4 in the vicinity of the rear end portion of the lock lever 30. The second bell crank link 75 is rotatable around a support shaft 76 of which an axis line extends in the width direction. The second bell crank link 75 that is made of plate material includes a pressing portion 75a formed substantially in a letter L and an attachment portion 75b formed substantially in a letter l. The pressing portion 75a radially extends from the support shaft 76 in an obliquely downward and forward direction. The attachment portion 75b radially extends from the support shaft 76 in the downward direction. A distal end portion of the pressing portion 75a that is bent in an obliquely downward and rearward direction faces the insertion bore 15B (and the rear end portion of the lock lever 30) in the clockwise direction in FIGS. 11A and 11B relative to the support shaft 76. A rotation locus or passage of the distal end portion of the pressing portion 75a is secured by the insertion bore 15B.

Therefore, in a case where the second bell crank link 75 rotates about the support shaft 76 in the clockwise direction in FIG. 11A, the lock lever 30 is pressed by the distal end portion of the pressing portion 75a that passes through the insertion bore 15B as illustrated in FIG. 11B so that the locking of the relative movement of the upper rail 4 relative to the lower rail 3 is released.

A second lever biasing member 77 formed by a torsion spring, for example, is wound around the support shaft 76. One end of the second lever biasing member 77 engages with the second bell crank link 75 while the other end of the second lever biasing member 77 engages with the support shaft 76 so that the second bell crank link 75 is biased in the counterclockwise direction in FIGS. 11A and 11B. The second bell crank link 75 is configured to be held at the initial rotation position at which the lock lever 30 is released from the second bell crank link 75 by the biasing force of the second lever biasing member 77.

A first end 78a of a release cable 78 engages with the attachment portion 75b of the second bell crank link 75. The release cable 78 extends rearward in the vehicle from the attachment portion 75b. A second end of the release cable 78 is connected to the seatback 8. In association with the forward folding of the seatback 8, the attachment portion 75b of the second bell crank link 75 is pulled rearward via the release cable 78 so that the second bell crank link 75 rotates about the support shaft 76 in the clockwise direction in FIGS. 11A and 11B against the biasing force of the second lever biasing member 77. At this time, the lock lever 30 that is pressed by the distal end portion of the pressing portion 75a releases the locking of the relative movement of the lower rail 3 and the upper rail 4.

Timing at which the locking of the relative movement of the lower rail 3 and the upper rail 4 in the second pair is released by the lock lever 30 at the second side in the width direction in association with the forward folding of the seatback 8 is configured to be synchronized with timing at which the locking of the relative movement of the lower rail 3 and the upper rail 4 in the first pair is released by the lock lever 30 at the first side in the width direction in association with the forward folding of the seatback 8.

Thereafter, in a case where the seatback 8 is pulled back to release the forward folded state, the lock lever 30 is released from the second bell crank link 75 that returns to the initial rotation position, which results in the locking of the relative movement between the lower rail 3 and the upper rail 4. At this time, timing at which the relative movement of the lower rail 3 and the upper rail 4 in the second pair is locked by the lock lever 30 at the second side is also configured to be synchronized with timing at which the relative movement of the lower rail 3 and the upper rail 4 in the first pair is locked by the lock lever 30 at the first side.

Next, operations of the seat slide apparatus according to the first embodiment will be explained. In a case where the seatback 8 is pulled back to release the forward folded state thereof in a state where the upper rail 4 that is movable relative to the lower rail 3 in association with the forward folding of the seatback 8 is arranged at an arbitrary position within a movable range of the upper rail 4, the lock lever 30 is released from the first bell crank link 70 that returns to the initial rotation position. Thus, the relative rotation of the upper rail 4 relative to the lower rail 3 may be locked. That is, without the return to the neutral position, the relative movement of the upper rail 4 relative to the lower rail 3 may be locked at the time when the forward folded state of the seatback 8 is released.

At the time the seatback 8 is pulled back so that the forward folded state thereof is released, the memory link 60 returns to the separation position. Therefore, even in a case where the release handle 6 is operated to thereby move the upper rail 4 in the front-rear direction, the memory link 60 is inhibited from interfering or contacting with the stopper portion 25 to block the movement of the upper rail 4.

As mentioned above, according to the first embodiment, the relative movement of the upper rails 4 relative to the lower rails 3 may be locked or restricted at the time the forward folded state of the seatback 8 is released, without the return to the neutral position of the lower rails 3 and the upper rails 4. Thus, in a case where the seatback 8 is brought to a state so that an occupant may be seated in the seat, i.e., whenever the seatback 8 is ready for an occupant to be seated, the relative movement of the upper rails 4 relative to the lower rails 3 is locked, which may improve operability of the seat slide apparatus.

In addition, in the present embodiment, the lock lever 30, the stopper portion 25, and the memory link 60 (except for the engagement portion 61*a*) are accommodated within the void S formed by the lower rail 3 and the upper rail 4. Further, the first bell crank link 70 is configured to press the lock lever 30 in the rotation direction where the locking of the relative movement of the lower rail 3 and the upper rail 4 is released and to release the memory link 60 (the engagement portion 61*a*) so that the memory link 60 rotates to the engageable position. Accordingly, only and basically the first bell crank link 70 and the first lever biasing member 72 are disposed at the outside of the lower rail 3 and the upper rail 4, i.e., at the upper side of the upper rail 4, which may lead to a reduction of space at the outside of the lower rail 3 and the upper rail 4.

Further, in the present embodiment, each of the memory link 60 and the first bell crank link 70 is made of plate material which is rotatably connected to the upper rail 4 and of which axis line extends in the width direction. The thickness direction of each of the memory link 60 and the first bell crank link 70 coincides with the width direction. Thus, the memory link 60 may be disposed within the space of the upper rail 4 in the width direction in a compact manner. At the upper side of the upper rail 4, the memory link 60 (specifically, the engagement portion 61*a*) and the first bell crank link 70 may be arranged in a compact manner.

Furthermore, in the present embodiment, the fixation pin 26 that supports the memory link 60 is configured so that the first end of the fixation pin 26 is secured to the corresponding second side wall portion 14 while the second end of the fixation pin 26 penetrates through the corresponding second side wall portion 14 so as to be movable relative thereto in the width direction. Thus, even in a case of a possible deformation of the cross-sectional shape of the upper rail 4 resulting from the balls 20*a*, for example, that are disposed between the lower rail 3 and the upper rail 4 for achieving a slidable movement between the lower rail 3 and the upper rail 4, such deformation may be absorbed by the movement of the fixation pin 26 in the width direction. As a result, a possibility of unstable rotation of the memory link 60 connected to the upper rail 4 via the fixation pin 26 may be reduced.

Furthermore, in the present embodiment, the fixation pin 26 is arranged at a substantially center portion between the second lower ball guide portions 19 and the second upper ball guide portions 16*a* in the up-down direction. Thus, in a case of a possible deformation of the cross-sectional shape of the upper rail 4 caused by the balls 20*a* disposed between the lower rail 3 and the upper rail 4 at the second lower ball guide portions 19 and the second upper ball guide portions 16*a*, the fixation pin 26 is unlikely to be influenced by such deformation. As a result, the possibility of unstable rotation of the memory link 60 may be further reduced.

Furthermore, in the present embodiment, the stopper portion 25, for example, which is related to the return of the relative position between the lower rail 3 and the upper rail 4 to the neutral position may be provided at one of the lower rails 3 provided at one of the first and second sides in the width direction (i.e., according to the present embodiment, at the first side). Thus, as compared to a case where the stopper portion 25 is provided at each of the lower rails 3 at the first and second sides in the width direction, the number of components may be reduced. At the second pair of the lower rail 3 and the upper rail 4 at which the first bell crank link 70 is not provided, in a case where the second bell crank link 75 rotates from the initial rotation position against the biasing force of the second lever biasing member 77 in association with the forward folding of the seatback 8, the lock lever 30 is pressed in the rotation direction for releasing the locking of the relative movement of the upper rail 4 relative to the lower rail 3. Thus, the lock lever 30 releases the locking of the relative movement of the upper rail 4 relative to the lower rail 3. Accordingly, in association with the forward folding of the seatback 8, the lock levers 30 (first and second lock levers or members) provided at the first pair of the lower rail 3 and the upper rail 4 and the second pair of the lower rail 3 and the upper rail 4 coordinate with each other to release the locking of the relative movement of the upper rail 4 relative to the lower rail 3.

Furthermore, in the present embodiment, the support shaft 22 that supports the lock lever 30 (specifically, the stem portion 31) relative to the upper rail 4 is configured so that the first end of the support shaft 22 is secured to the corresponding second side wall portion 14 while the second end of the support shaft 22 penetrates through the corresponding second side wall portion 14 so as to be movable relative thereto in the width direction. Thus, even in a case of a possible deformation of the cross-sectional shape of the upper rail 4 caused by the balls 20*a* that are disposed between the lower rail 3 and the upper rail 4, such deformation may be absorbed by the movement of the support shaft 22 in the width direction. As a result, deformation of the lock lever 30 may be restrained. Further, a possibility of unstable rotation of the lock lever 30 may be reduced.

Furthermore, in the present embodiment, the support shaft 22 is arranged at a substantially center portion between the second lower ball guide portions 19 and the second upper ball guide portions 16*a* in the up-down direction. Thus, in a case of a possible deformation of the cross-sectional shape of the upper rail 4 caused by the balls 20*a* disposed between the lower rail 3 and the upper rail 4 at the second lower ball guide portions 19 and the second upper ball guide portions 16*a*, the support shaft 22 is unlikely to be influenced by such deformation. As a result, the deformation of the lock lever 30 may be further restrained.

A second embodiment will be explained below. According to the second embodiment, cross-sectional configurations of the lower and upper rails and engagement configurations of the memory link and the stopper portion related to the return to the neutral position mainly differ from the first embodiment. The similar or same configurations of the second embodiment relative to the first embodiment bear the same reference numerals and explanation thereof will be omitted.

Figure 12:
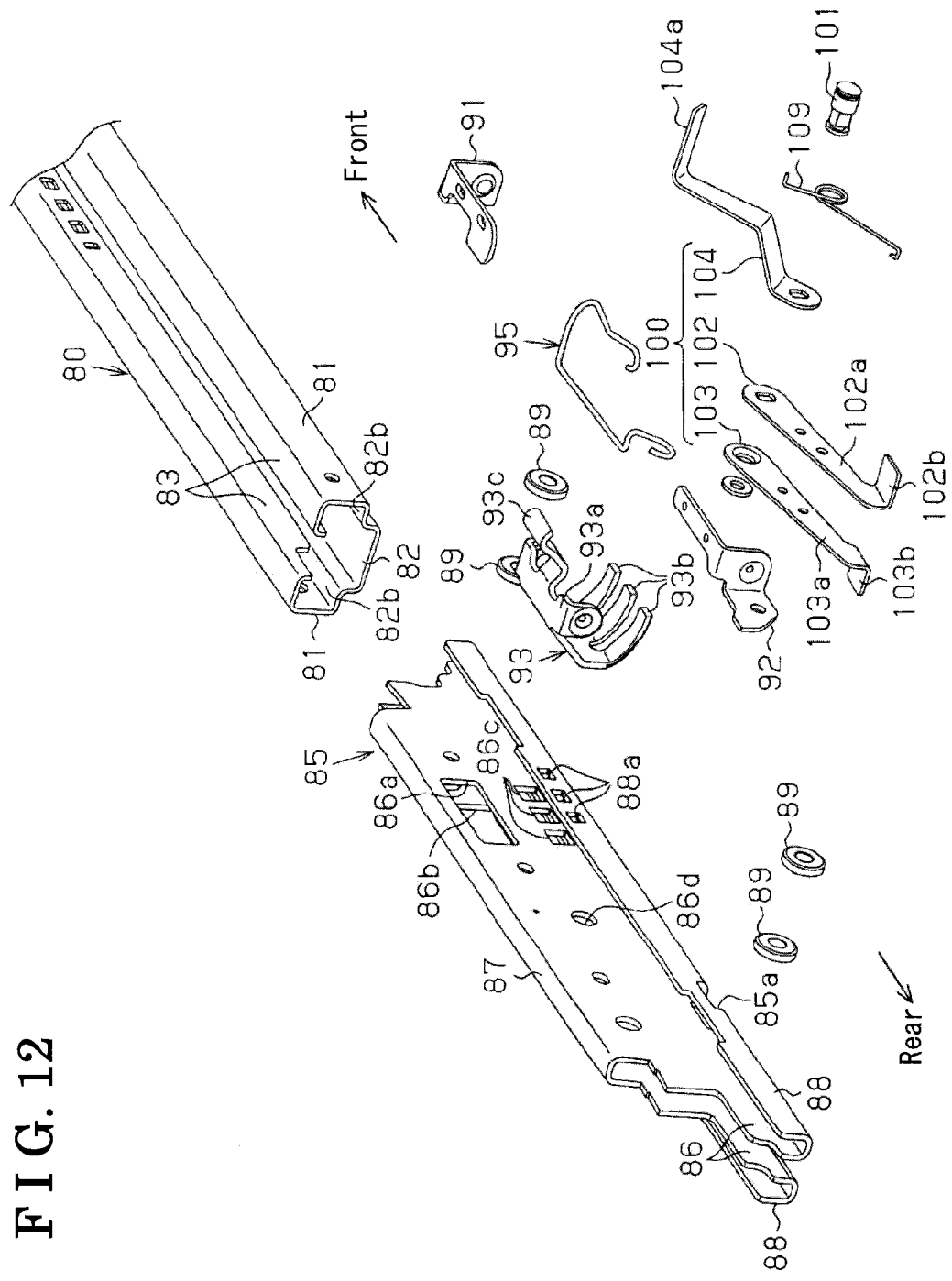
FIG. 12 is an exploded perspective view of the seat slide apparatus according to a second embodiment disclosed here.
Figure 13:
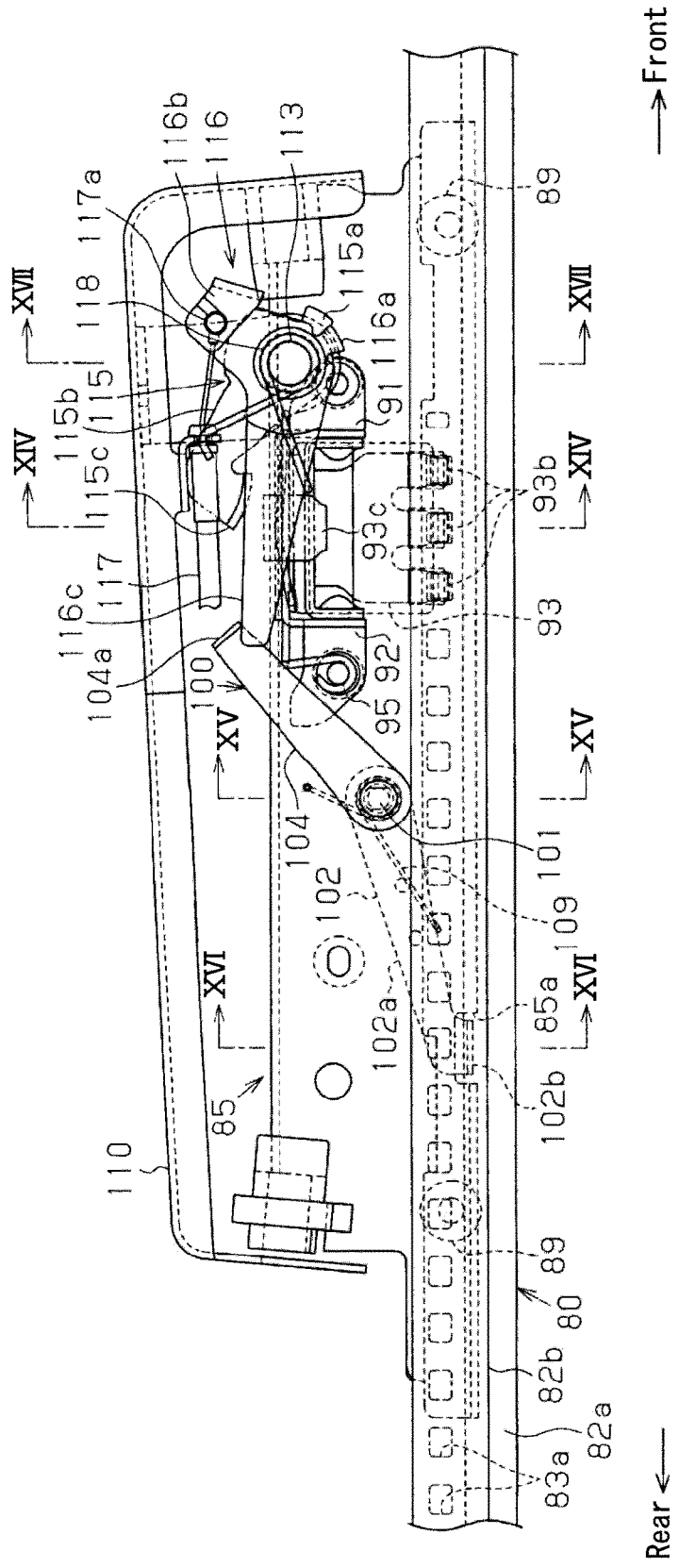
FIG. 13 is a side view of the seat slide apparatus according to the second embodiment.
Figure 14:
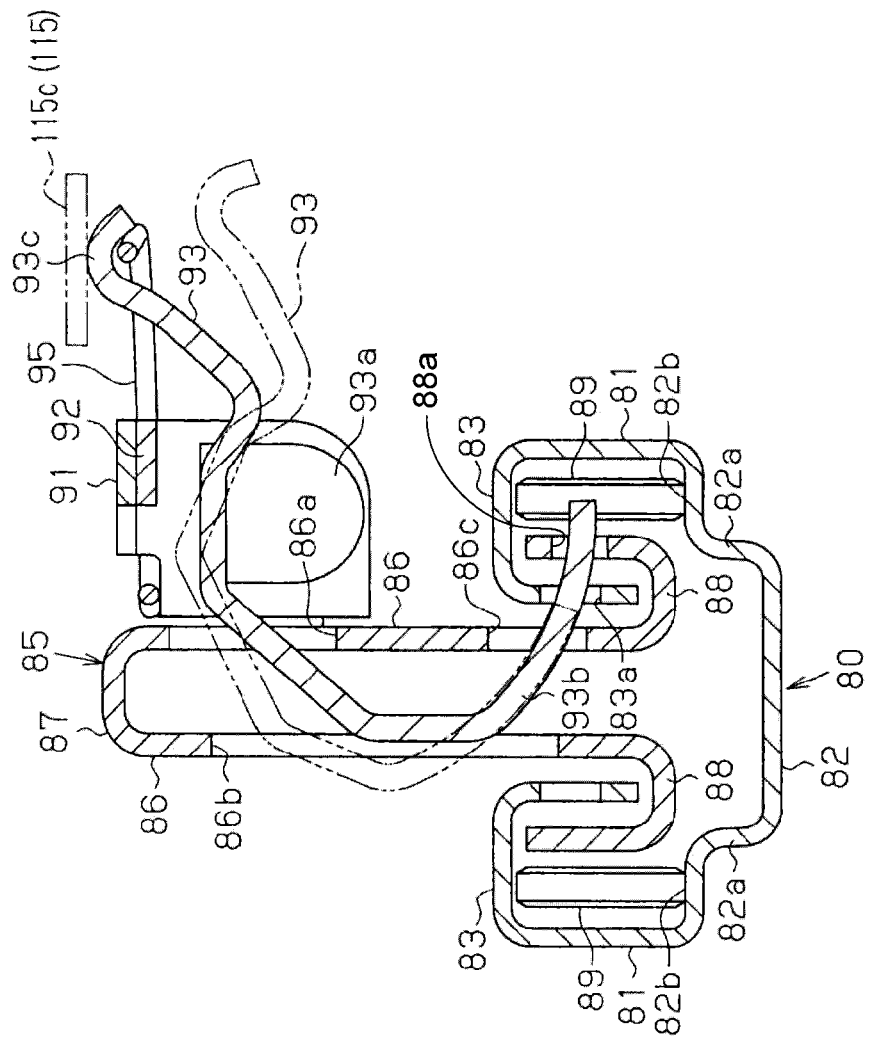
FIG. 14 is a cross-sectional view taken along line XIV-XIV in FIG. 13.

As illustrated in FIG. 12, in the second embodiment, a lower rail 80 made of plate material includes a pair of first side wall portions 81, a bottom wall portion 82, and a pair of first flanges 83. As illustrated in FIG. 13, plural locking holes 83a each of which is in a square form and which opens in the width direction are formed at substantially a center portion of each of the first flanges 83 in a long-side direction thereof corresponding to the front-rear direction. The plural locking holes 83a are arranged at even intervals in the long-side direction of the first flange 83. As illustrated in FIG. 14, opposed end portions of the bottom wall portion 82 in the width direction are raised upward via a pair of stepped portions 82a so as to form or include passage portions 82b respectively.

An upper rail 85 made of plate material includes a pair of second side wall portions 86, a cover wall portion 87, and a pair of second flanges 88. In the same way as the first embodiment, the lower rail 80 and the upper rail 85 in a pair (a first pair) as illustrated in FIG. 12 and the lower rail 80 and the upper rail 85 in another pair (a second pair) are arranged to face each other in the width direction. The lower rail 80 and the upper rail 85 in the first pair are provided at a first side in the width direction while the lower rail 80 and the upper rail 85 in the second pair are provided at a second side in the width direction. In addition, the lower rails 80 serve as the first and second lower rails while the upper rails 85 serve as the first and second upper rails. A first through-hole 86a substantially in a square form is formed at an upper end portion of one of the second side wall portions 86 provided at an inner side in the width direction, which will be hereinafter referred to as the inner second side wall portion 86. The inner second side wall portion 86 which is illustrated at a right side in FIG. 12 is positioned to face the lower rail 80 and the upper rail 85 in the second pair. A second through-hole 86b substantially in a square form is formed at the other of the second side wall portions 86 provided at an outer side in the width direction, which will be hereinafter referred to as the outer second side wall portion 86. The outer second side wall portion 86 which is illustrated at a left side in FIG. 12 is positioned to be away from the lower rail 80 and the upper rail 85 in the second pair. The first through-hole 86a and the second through-hole 86b are arranged at substantially the same positions as each other in the front-rear direction. An opening width of the second through-hole 86b in the up-down direction is specified to be greater than an opening width of the first through-hole 86a in the up-down direction.

As illustrated in FIG. 12, plural (three) insertion bores 86c are formed at a lower end portion of the inner second side wall portion 86 to be spaced away from one another for predetermined distance in the long-side direction, i.e., in the front-rear direction. In addition, plural (three) insertion bores 88a are formed at one of the second flanges 88 that is provided at the inner side in the width direction (i.e., the inner second flange 88) so as to be spaced away from one another for the predetermined distance in the long-side direction corresponding to the front-rear direction. The insertion bores 86c formed at the second side wall portion 86 are disposed at substantially the same positions as the respective insertion bores 88a formed at the second flange 88 in the front-rear direction within a range where the first and second through-holes 86a and 86b are arranged in the front-rear direction.

A pair of wheels, i.e., front and rear wheels 89, is supported at each of the second flanges 88 of the upper rail 85 in a rolling manner. Specifically, the front and rear wheels 89 are supported at the corresponding passage portion 82b of the lower rail 80 in a rolling manner so that the upper rail 85 is connected to the lower rail 80 to be movable thereto in the long-side direction corresponding to the front-rear direction.

A pair of support brackets, i.e., front and rear support brackets 91 and 92, is secured or fastened to the inner second side wall portion 86 in a state to be positioned at a front side and a rear side of the first through-hole 86a respectively. The front and rear support brackets 91 and 92 support a lock lever 93 serving as the lock member and made of plate material, for example. The lock lever 93 is supported by the front and rear support brackets 91 and 92 at an inner side of the inner second side wall portion 86 in the width direction so as to be rotatable around an axis line that extends in the front-rear direction.

The lock lever 93 includes a body portion 93a and plural (three) locking protrusions 93b. The body portion 93a is formed substantially in a letter U and is supported by the front and rear support brackets 91 and 92 so as to be rotatable thereto. The locking protrusions 93b project downwardly from the body portion 93a. The locking protrusions 93b are disposed so as to correspond to the positions of the insertion bores 86c and 88a in the front-rear direction.

As illustrated in FIG. 14, the lock lever 93 that is sequentially inserted to the first through-hole 86a and the second through-hole 86b from the inner side in the width direction is configured so that the locking protrusions 93b which penetrate through the respective insertion bores 86c are sequentially insertable to the corresponding locking holes 83a and insertion bores 88a in association with the rotation of the lock lever 93 about the axis line thereof. Then, as illustrated in FIG. 14 with solid lines, in a case where the locking protrusions 93b of the lock lever 93 are inserted to be positioned within the corresponding locking holes 83a and insertion bores 88a, the relative movement between the lower rail 80 and the upper rail 85 is locked. On the other hand, as illustrated in FIG. 14 with double-dotted lines, in a case where the lock lever 93 rotates in the clockwise direction in FIG. 14 so that the locking protrusions 93b disengage from the corresponding locking holes 83a and insertion bores 88a, the locking of the relative movement between the lower rail 80 and the upper rail 85 is released.

As illustrated in FIG. 12, the lock lever 93 includes an input portion 93c formed substantially in a letter S and projecting inward in the width direction and obliquely upward from a substantially center portion of the body portion 93a in the front-rear direction. One end of a lock spring 95 made of a single wire rod engages with the input portion 93c. The other end of the lock spring 95 engages with the support bracket 92 so that the lock lever 93 is biased to rotate in a direction where the input portion 93c is lifted up, i.e., where the locking protrusions 93b are inserted to the corresponding locking holes 83a and insertion bores 88a. That is, in a case where the lock lever 93 receives an operation force for lowering the input portion 93c against the biasing force of the lock spring 95, the lock lever 93 may release the locking of the relative movement between the lower rail 80 and the upper rail 85.

Figure 21:
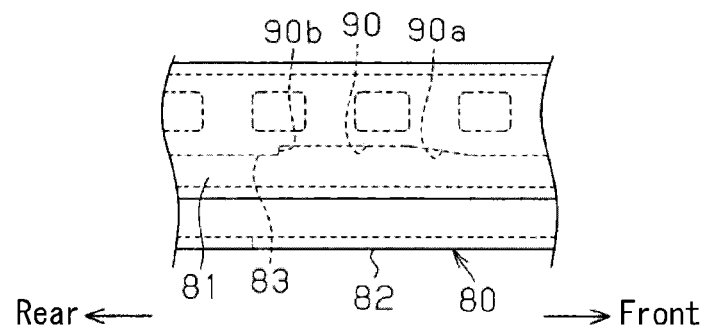
FIG. 21 is a side view illustrating the stopper portion according to the second embodiment.

Peripheral configurations of one of the lower rails 80 in the first pair, and the like, provided at one side (the first side) of the seat 5 in the width direction will be explained. As illustrated in FIG. 21, a stopper portion 90 is formed by cutting at a lower portion of each of the first flanges 83 of the lower rail 80 so as to be positioned at a substantially center portion in the long-side direction. That is, the stopper portion 90 serves as a cut portion formed at each of the first flanges 83. An upper surface of the stopper portion 90 forms a guide surface 90a and a rear end surface of the stopper portion 90 forms an engagement surface 90b in a stepped form. The guide surface 90a is an inclined surface inclined upwardly from a lower end of the first flange 83 in a direction towards the rear side of the vehicle from a front end of the stopper portion 90. The engagement surface 90b is formed substantially vertically from the lower end of the first flange 83.

Figure 15:
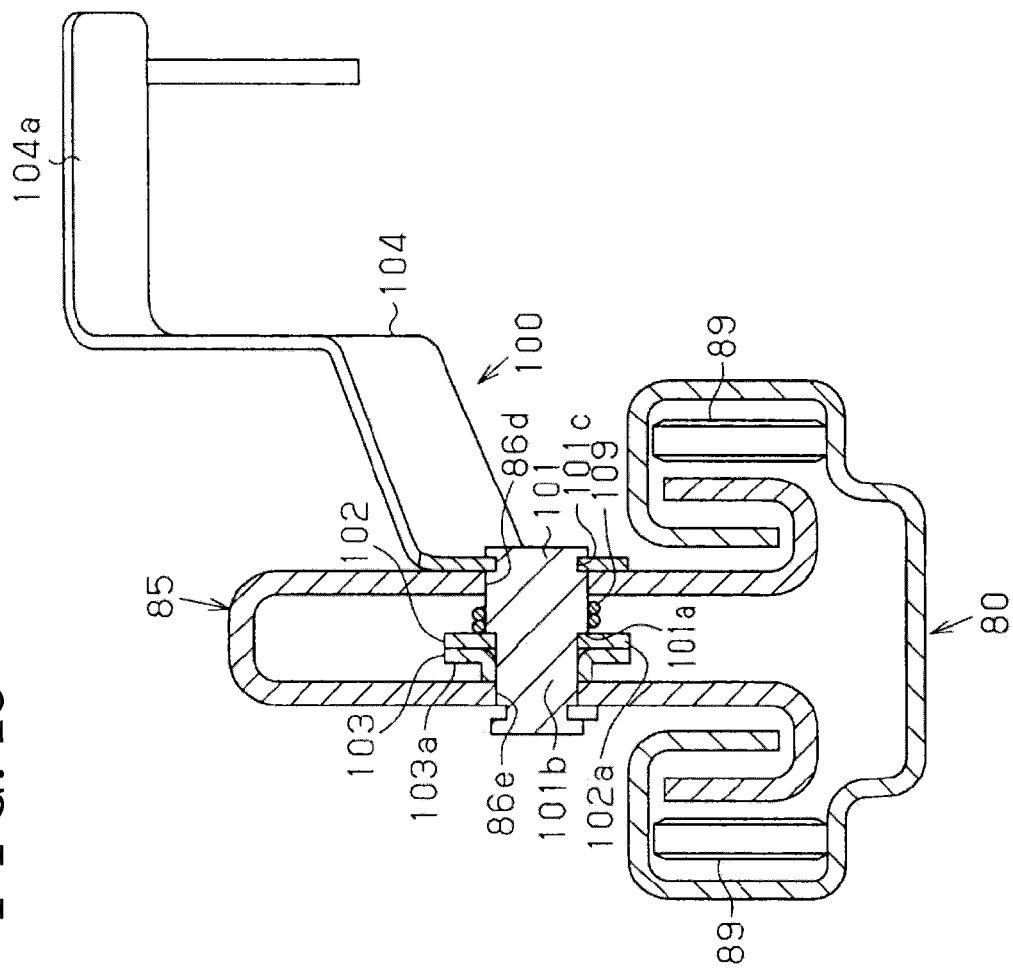
FIG. 15 is a cross-sectional view taken along line XV-XV in FIG. 13.
Figure 16:
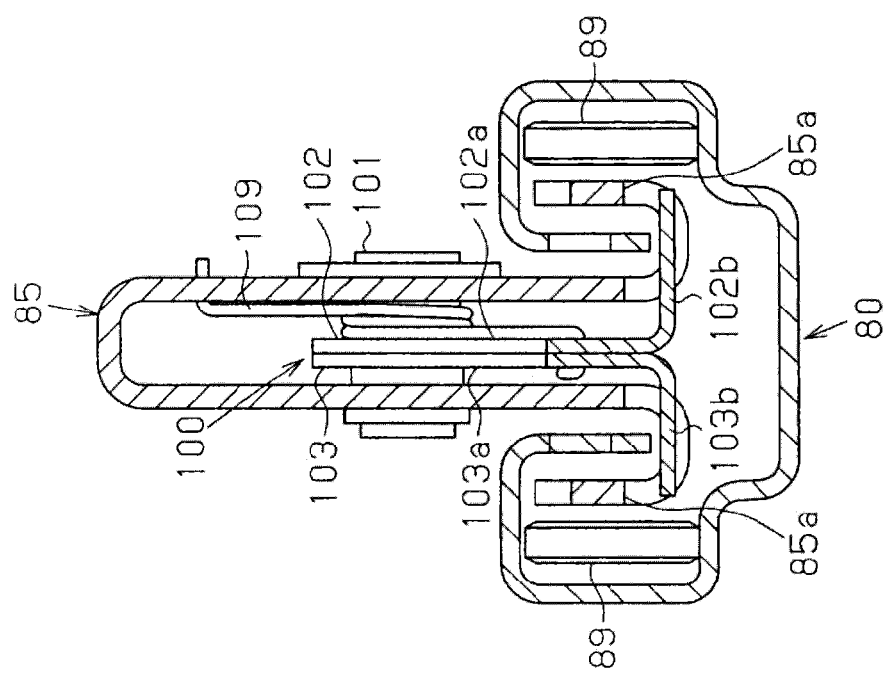
FIG. 16 is a cross-sectional view taken along line XVI-XVI in FIG. 13.

As illustrated in FIGS. 12 and 13, a memory link 100 is connected to the upper rail 85 to be rotatable thereto at the rear side of the lock lever 93. As illustrated in FIGS. 15 and 16, first and second bearing bores 86d and 86e each of which includes a circular form are formed at the respective second side wall portions 86 so as to be positioned in the rear of the first and second through-holes 86a and 86b respectively. The first and second bearing bores 86d and 86e are concentric circles relative to each other and in communication with each other in the width direction. A rotation shaft 101 in a column form is pivotally supported at the second side wall portions 86 in a state where opposed ends of the rotation shaft 101 are inserted to be positioned within the first and second bearing bores 86d and 86e respectively. An axis line of the rotation shaft 101 extends in the width direction. As illustrated in FIG. 15, a portion of the rotation shaft 101 facing the second bearing bore 86e is reduced in a radial direction (i.e., a diameter of the portion of the rotation shaft 101 is reduced) via a stepped portion 101a that is formed at a substantially center portion in a long-side direction (i.e., an axial direction) of the rotation shaft 101. The portion of the rotation shaft 101 facing the second bearing bore 86e relative to the stepped portion 101a forms a first fitting portion 101b. The first fitting portion 101b is formed in a substantially oval column obtained by cutting a column by two planes parallel to each other. In addition, an end portion of the rotation shaft 101 that penetrates through the first bearing bore 86d forms a second fitting portion 101c formed in a substantially oval column obtained by cutting a column (or a disc) by two planes parallel to each other.

As illustrated in FIGS. 12 and 15, the memory link 100 includes a pair of engagement plates, i.e., first and second engagement plates 102 and 103, each of which is made of plate material, for example. The first fitting portion 101b of the rotation shaft 101 is inserted to be fitted at the first and second engagement plates 102 and 103 within the upper rail 85. The first and second engagement plates 102 and 103 are rotatable, together with the rotation shaft 101, around the first and second bearing bores 86d and 86e. The first engagement plate 102 includes a first arm portion 102a and a first engagement portion 102b while the second engagement plate 103 includes a second arm portion 103a and a second engagement portion 103b. Each of the first and second arm portions 102a and 103a extends obliquely downward towards the rear side of the vehicle from the rotation shaft 101. The first and second engagement portions 102b and 103b extend in the width direction to be away from each other from respective lower ends of the first and second arm portions 102a and 103a. Accordingly, each of the first and second engagement plates 102 and 103 is formed substantially in a letter L in a state where the first and second engagement plates 102 and 103 are symmetric with each other in the width direction.

The first and second arm portions 102a and 103a of the first and second engagement plates 102 and 103 are joined and overlapped with each other in the width direction. In addition, the first and second arm portions 102a and 103a are sandwiched and disposed between the outer second side wall portion 86 (which is illustrated at a left side in FIG. 15) and the stepped portion 101a. Thus, the first and second engagement plates 102 and 103 are inhibited from moving in the width direction. As illustrated in FIG. 16, each of the first and second engagement portions 102b and 103b extends over (i.e., spans) the corresponding second side wall portion 86 and second flange 88 in the width direction.

As illustrated in FIG. 12, cut portions 85a are formed at the upper rail 85 in a state where each of the cut portions 85a penetrates through lower end portions of the second side wall portion 86 and the second flange 88. Specifically, one of the cut portions 85a is positioned to match the position of the first engagement portion 102b in the front-rear direction and the other of the cut portions 85a is positioned to mach the position of the second engagement portion 103b in the front-rear direction. The first and second engagement portions 102b and 103b face the respective cut portions 85a in the up-down direction. Therefore, in association with the rotation of the first and second engagement plates 102 and 103 around the first and second bearing bores 86d and 86e, the first and second engagement portions 102b and 103b enter the respective cut portions 85a so that the first and second engagement plates 102 and 103 may make contact with respective lower ends of the first flanges 83 of the lower rail 80.

As illustrated in FIG. 15, a memory link biasing member 109 formed by a torsion spring, for example, is wound around a portion of the rotation shaft 101 between one of the second side wall portions 86 at which the first bearing bore 86d is formed and the first engagement plate 102. One end of the memory link biasing member 109 engages with the aforementioned second side wall portion 86 and the other end of the memory link biasing member 109 engages with both the first and second arm portions 102a and 103a. The memory link biasing member 109 biases the first and second engagement plates 102, 103, and the rotation shaft 101 in a rotation direction (i.e., clockwise direction in FIG. 13) where the first and second engagement portions 102b and 103b make contact with the respective lower ends of the first flanges 83.

As illustrated in FIG. 15, the memory link 100 includes a pressed plate 104 made of plate material, for example, at which the second fitting portion 101c of the rotation shaft 101 is inserted to be fitted so as no to dislocate or disengage from the pressed plate 104. The pressed plate 104 is rotatable, together with the rotation shaft 101 and the first and second engagement plates 102 and 103, around the first and second bearing bores 86d and 86e. The pressed plate 104 is bent to form a substantially crank shape by rising in a stepwise manner towards the inner side in the width direction. An upper end portion of the pressed plate 104 extends in the width direction to form a pressed portion 104a.

Figure 17:
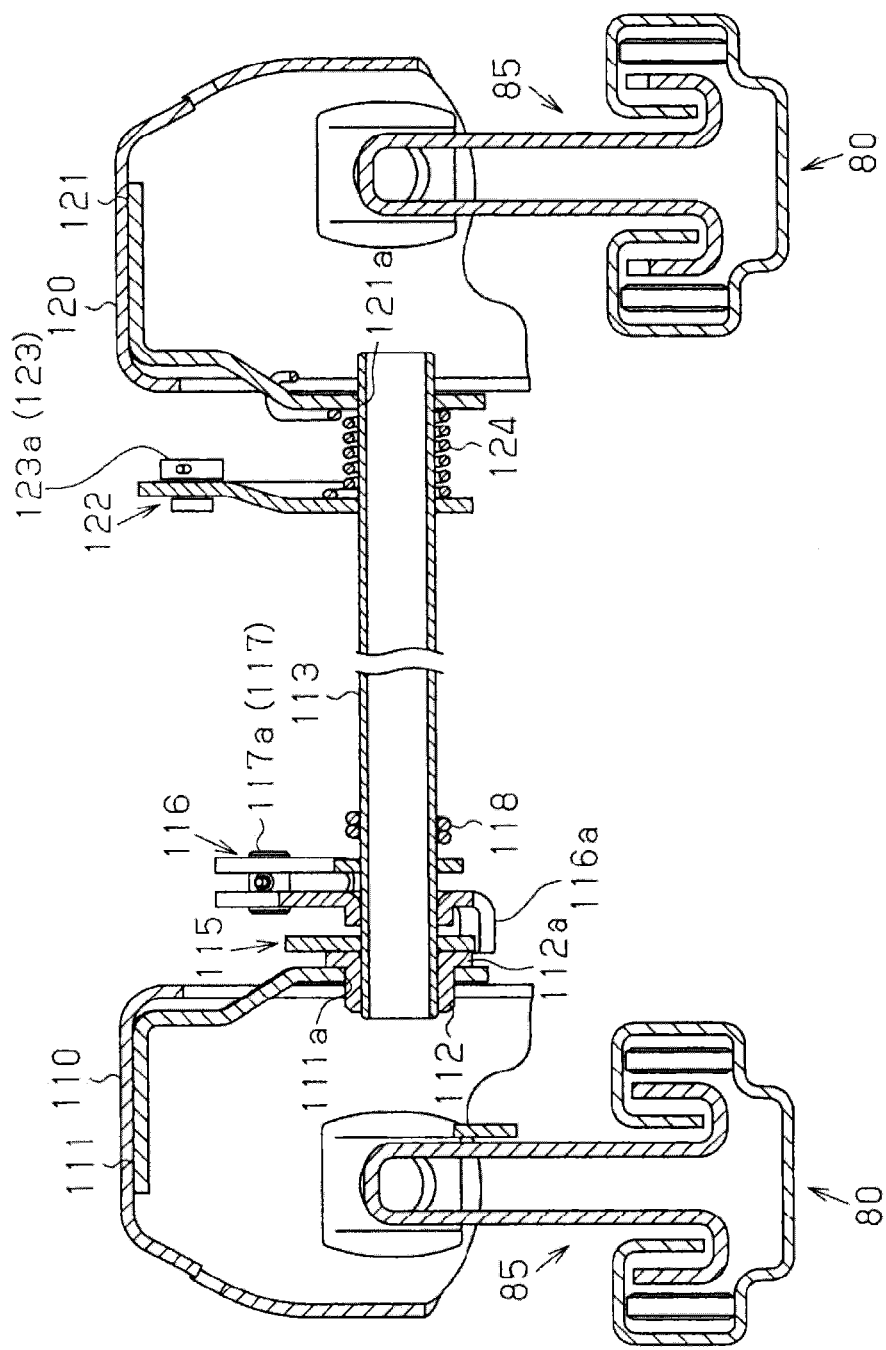
FIG. 17 is a cross-sectional view taken along line XVII-XVII in FIG. 13.

As illustrated at a left side in FIG. 17, a support frame 110 substantially in a square form opening downwardly and inwardly is secured or fastened to an upper portion of the upper rail 85. The seat 5 is supported at the upper rail 85 via the support frame 110. A support bracket 111 made of plate material, for example, is fixed to the support frame 110 by being inserted through an inner opening that opens inwardly. The support bracket 111 includes a wall portion which extends in the up-down direction and at which a bearing bore 111a in a circular form is formed to open in the width direction. A rotation shaft 112 substantially in a cylindrical form and including a flange 112a is inserted to the bearing bore 111a so as to be pivotally supported thereat. An axis line of the rotation shaft 112 extends in the width direction. In the aforementioned state, the flange 112a makes contact with a peripheral portion of the bearing bore 111a so that the rotation shaft 112 is inhibited from moving to the outer side in the width direction, i.e., towards the upper rail 85. In addition, one end (a first end portion) of a connection bar 113 is inserted to be fixed to the rotation shaft 112. The connection bar 113, which is substantially in a cylindrical form, includes an axis line that extends in the width direction.

Figure 18:
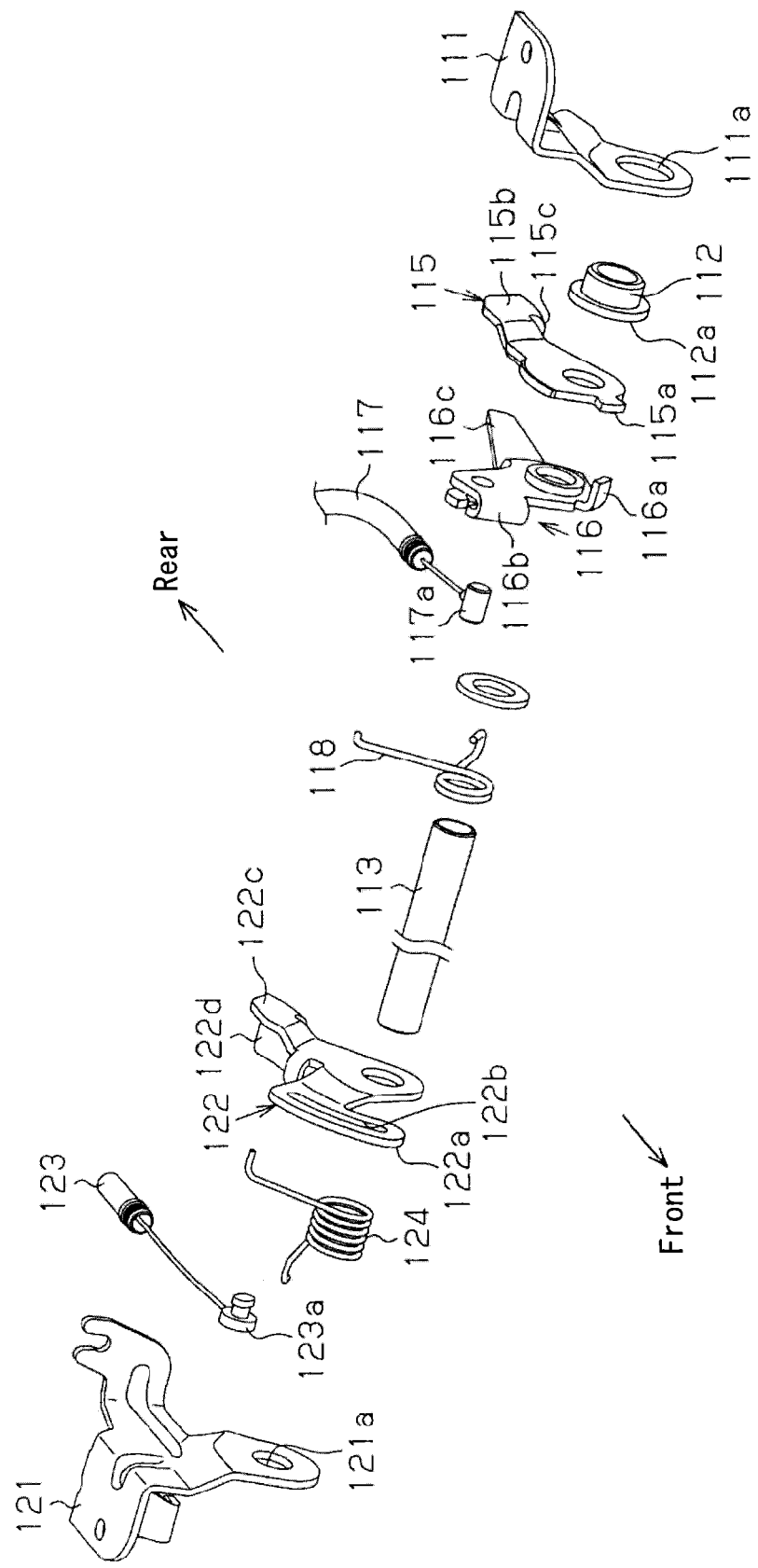
FIG. 18 is an exploded perspective view of the seat slide apparatus according to the second embodiment.

As also illustrated in FIG. 18, a first release lever 115 made of plate material, for example, is fixed to the connection bar 113 so as to be integrally rotatable with the connection bar 113. The first release lever 115 is positioned adjacent to the rotation shaft 112 (specifically, the flange 112a) at the inner side in the width direction. The first release lever 115 includes a pressed portion 115a, a projecting portion 115b, and a pressing portion 115c. The pressed portion 115a substantially in a hook form radially extends relative to the connection bar 113 in the forward direction of the vehicle. The projecting portion 115b extends in the rearward direction of the vehicle. The pressing portion 115c extends from a lower end of a distal end portion of the projecting portion 115b towards the inner side in the width direction. As illustrated in FIG. 14, the pressing portion 115c faces the input portion 93c of the lock lever 93 in the up-down direction. Thus, in a case where the first release lever 115 rotates together with the connection bar 113 in a direction where the pressing portion 115c is lowered, the lock lever 93 of which the input portion 93c is pressed by the pressing portion 115c releases the locking of the relative movement between the lower rail 80 and the upper rail 85.

A lever member 116 made of plate material, for example, is rotatably supported at the connection bar 113 so as to be positioned adjacent to the first release lever 115 at the inner side in the width direction. The lever member 116 includes a pressing portion 116a, an attachment portion 116b, and an engagement portion 116c. The pressing portion 116a substantially in a letter L radially extends relative to the connection bar 113 in the forward direction of the vehicle. The attachment portion 116b extends obliquely upward in the forward direction of the vehicle. The engagement portion 116c substantially in an arm form extends in the rearward direction of the vehicle.

As illustrated in FIG. 13, the pressing portion 116a of the lever member 116 is positioned at a lower side of the pressed portion 115a of the first release lever 115. Thus, in association with the rotation of the lever member 116 around the connection bar 113 in the counterclockwise direction in FIG. 13, which will be also referred to as the release direction, the pressed portion 115a may be pressed by the pressing portion 116a. A first end 117a of a first release cable 117 engages with the attachment portion 116b of the lever member 116. The first release cable 117 extends from the attachment portion 116b in the rearward direction of the vehicle. A second end of the first release cable 117 is connected to the seatback 8. In a case where the seatback 8 is folded forward, the attachment portion 116b is pulled by the first release cable 117 in the rearward direction of the vehicle to thereby rotate the lever member 116 in the release direction.

A distal end portion of the engagement portion 116c is positioned at a lower side of the pressed portion 104a of the memory link 100. Thus, in association with the rotation of the lever member 116 around the connection bar 113 in the clockwise direction in FIG. 13, the pressed portion 104a may be pressed by the engagement portion 116c.

As illustrated in FIG. 17, a lever biasing member 118 formed by a torsion spring, for example, is wound around the connection bar 113 so as to be positioned adjacent to the lever member 116 at the inner side in the width direction. One end of the lever biasing member 118 engages with the second side wall portion 86 while the other end of the lever biasing member 118 engages with the engagement portion 116c of the lever member 116 to thereby bias the lever member 116 to rotate in the clockwise direction in FIG. 13. The lever member 116 is held at the initial rotation position by the biasing force of the lever biasing member 118.

The lever member 116 in the initial rotation position is configured so that the pressing portion 116a makes contact or comes closer to the pressed portion 115a of the first release lever 115 and the engagement portion 116c that makes contact with the pressed portion 104a of the memory link 100 restricts or inhibits the rotation of the memory link 100 against the biasing force of the memory link biasing member 109. The memory link 100 that is inhibited from rotating by the lever member 116 in the initial rotation position is configured to be held at the rotation position at which the first and second engagement portions 102b and 103b of the memory link 100 are away from the respective lower ends of the first flanges 83 of the lower rail 80, which will be hereinafter also referred to as the separation position.

The biasing force of the lever biasing member 118 for holding the lever member 116 at the initial rotation position is specified to be greater than the biasing force of the memory link biasing member 109 for rotating the memory link 100 from the separation position.

Figure 20:
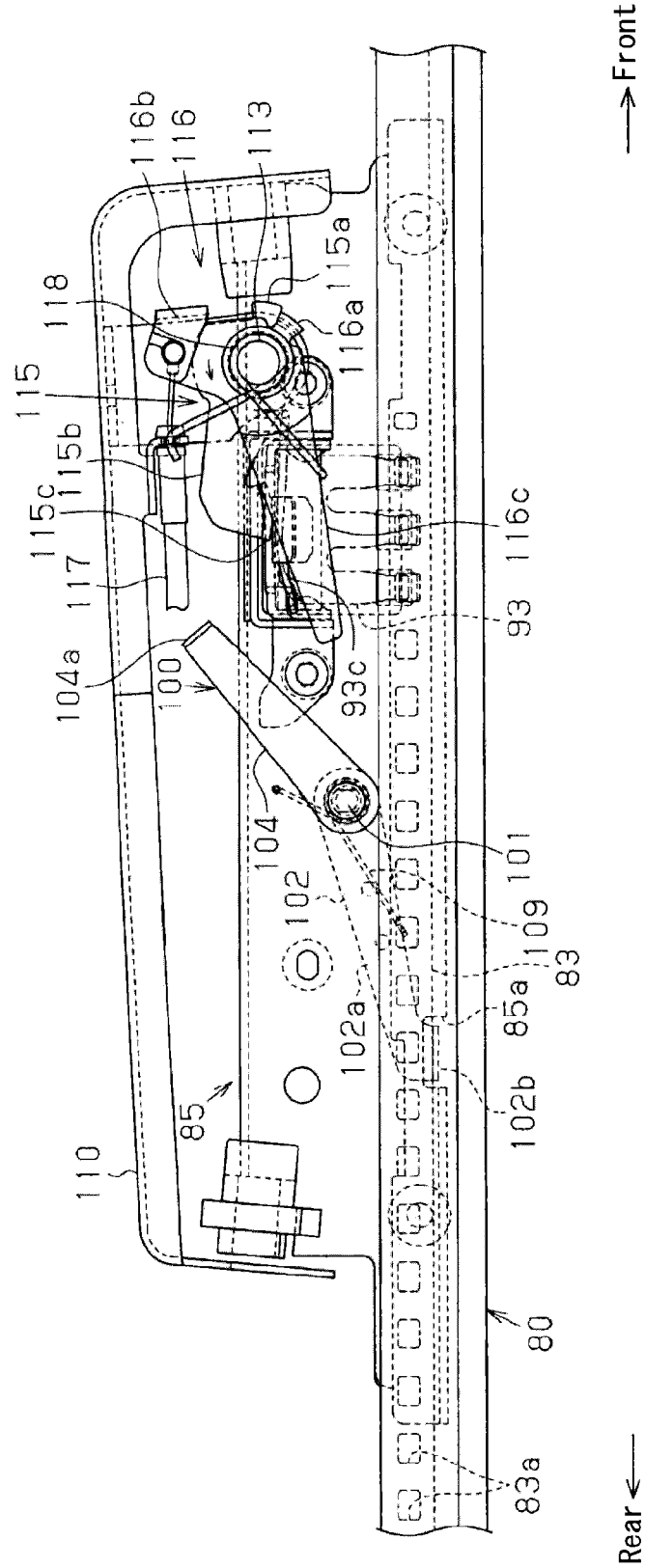
FIG. 20 is a side view illustrating the released state of the locking of the relative movement of the upper rail relative to the lower rail in association with the forward folding of the seatback according to the second embodiment.

As shown in FIGS. 13 and 20, in a case where the lever member 116 rotates in the release direction against the biasing force of the lever biasing member 118, the first release lever 115 of which the pressed portion 115a is pressed by the pressing portion 116a integrally rotates with the connection bar 113 in the counterclockwise direction in FIG. 13. At this time, the lock lever 93 of which the input portion 93c is pressed by the pressing portion 115c rotates in the direction where the input portion 93c is lowered against the biasing force of the lock spring 95, i.e., where the locking protrusions 93b disengage from the respective locking holes 83a, for example.

The memory link 100 of which the pressed portion 104a is released from the engagement portion 116c rotates in the clockwise direction in FIG. 13 by the biasing force of the memory link biasing member 109. As a result, the memory link 100 is held at the rotation position at which the first and second engagement portions 102b and 103b are in contact with the respective lower ends of the first flanges 83 of the lower rail 80, which will be hereinafter also referred to as the engageable position.

Peripheral configurations of the other of the lower rails 80 in the second pair, and the like, provided at the other side (the second side) of the seat 5 in the width direction will be explained. At the second side, the memory link 100 and the lever member 116, for example, are not provided at the upper rail 85 in the second pair at the second side.

As illustrated at a right side in FIG. 17, a support frame 120 substantially in a square form opening downwardly and inwardly is secured or fastened to the upper portion of the upper rail 85. The seat 5 is supported at the upper rail 85 via the support frame 120. A support bracket 121 made of plate material, for example, is fixed to the support frame 120 by being inserted through an inner opening that opens inwardly. The support bracket 121 includes a wall portion which extends in the up-down direction and at which a bearing bore 121a in a circular form is formed to open in the width direction. The bearing bore 121a is arranged to be concentric with the bearing bore 111a of the support bracket 111. The other end (a second end portion) of the connection bar 113 is inserted to be pivotally supported at the bearing bore 121a.

As illustrated in FIGS. 17 and 18, a second release lever 122 made of plate material, for example, is fixed to the connection bar 113 so as to be integrally rotatable with the connection bar 113. The second release lever 122 is positioned adjacent to the support bracket 121 at the inner side in the width direction. The second release lever 122 includes an attachment portion 122a, a projecting portion 122c, and a pressing portion 122d. The attachment portion 122a substantially formed in a letter L radially extends relative to the connection bar 113 in an obliquely upward and forward direction of the vehicle. An elongated bore 122b is formed at a distal end portion of the attachment portion 122a so as to extend in a circumferential direction relative to the connection bar 113. The projecting portion 122c projects in the rearward direction of the vehicle. The pressing portion 122d extends from a lower end of a distal end portion of the projecting portion 122c to the inner side in the width direction. By following the pressing portion 115c of the first release lever 115, the pressing portion 122d faces the input portion 93c of the lock lever 93 in the up-down direction. Accordingly, in a case where the second release lever 122 rotates together with the connection bar 113 in the direction where the pressing portion 122d is lowered, the lock lever 93 of which the input portion 93c is pressed by the pressing portion 122d releases the locking of the relative movement between the lower rail 80 and the upper rail 85 in the aforementioned manner.

Figure 23:
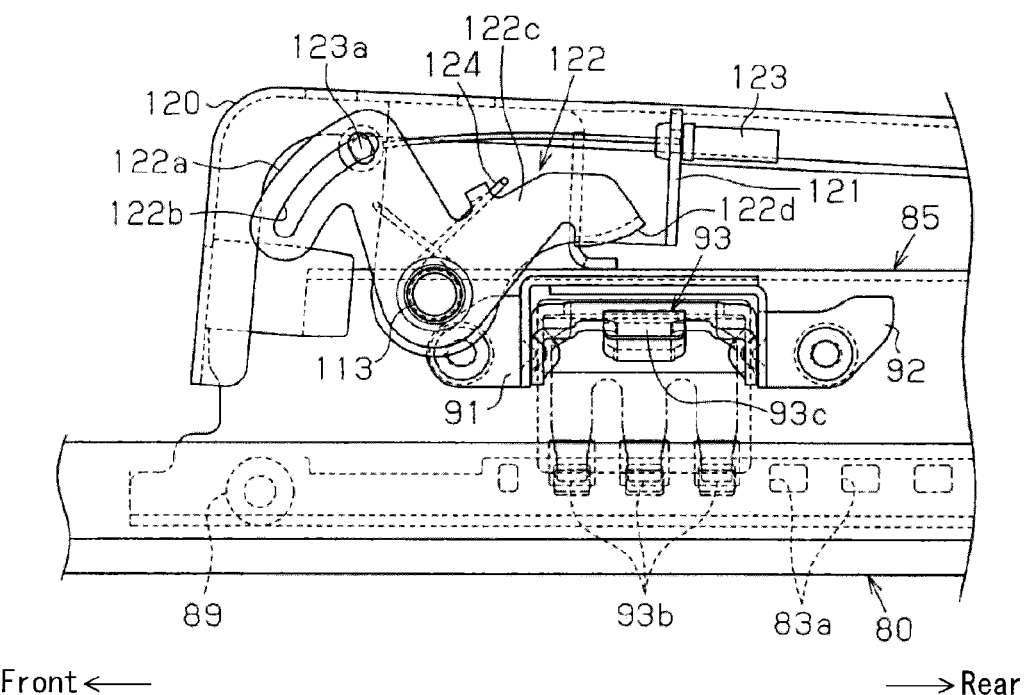
FIG. 23 is a side view of the seat slide apparatus according to the second embodiment.

As illustrated in FIGS. 17 and 23, a return spring 124 formed by a torsion coil spring, for example, is wound around a portion of the connection bar 113 between the support bracket 121 and the second release lever 122. One end of the return spring 124 engages with the support bracket 121 while the other end of the return spring 124 engages with the second release lever 122 so that the return spring 124 biases the second release lever 122 to rotate in a rotation direction where the pressing portion 122d is separated from (i.e., releases) the lock lever 93 (specifically, the input portion 93c) corresponding to the counterclockwise direction in FIG. 23. The second release lever 122 that is biased by the return spring 124 is held at a predetermined rotation position at which the pressing portion 122d is separated from (i.e., releases) the lock lever 93 (the input portion 93c). The aforementioned predetermined rotation position will be hereinafter also referred to as a standby position.

As illustrated in FIG. 13, the first release lever 115 connected to the second release lever 122 via the connection bar 113 so as to be integrally rotatable with the second release lever 122 is also held at the predetermined rotation position at which the pressing portion 115c is separated from (i.e., releases) the lock lever 93 (specifically, the input portion 93c) corresponding to the standby position. At this time, the pressed portion 115a of the first release lever 115 makes contact with or comes closer to the pressing portion 116a of the lever member 116. That is, the first and second release levers 115 and 122 are held at the respective standby positions by the common return spring 124.

As illustrated in FIG. 23, a first end 123a of a second release cable 123 is inserted to the elongated bore 122b in a manner to be inhibited from disengaging from the elongated bore 122b. The second release cable 123 extends in the rearward direction of the vehicle from the attachment portion 122a. The second end of the second release cable 123 is connected to a release handle. In a case where the release handle is operated, the attachment portion 122a is pulled by the second release cable 123 in the rearward direction of the vehicle. As a result, the second release lever 122 rotates from the standby position and the first release lever 155 that integrally rotates with the second release lever 122 together with the connection bar 113 also rotates from the standby position.

As illustrated in FIGS. 13 and 23, in a case where the seatback 8 is not folded forward and the release handle is not operated, the first and second release levers 115 and 122 are held at the respective standby positions so that each of the lock levers 93 that is released from each of the first and second release levers 115 and 122 rotates by the biasing force of the lock spring 95 in the direction where the input portion 93c is lifted up, i.e., where the locking protrusions 93b are inserted to be positioned within the respective locking holes 83a, for example. Accordingly, the relative movement between the lower rails 80 and the upper rails 85 is locked. The position of the seat 5 in the front-rear direction supported by the upper rails 85 is held and maintained.

Figure 24:
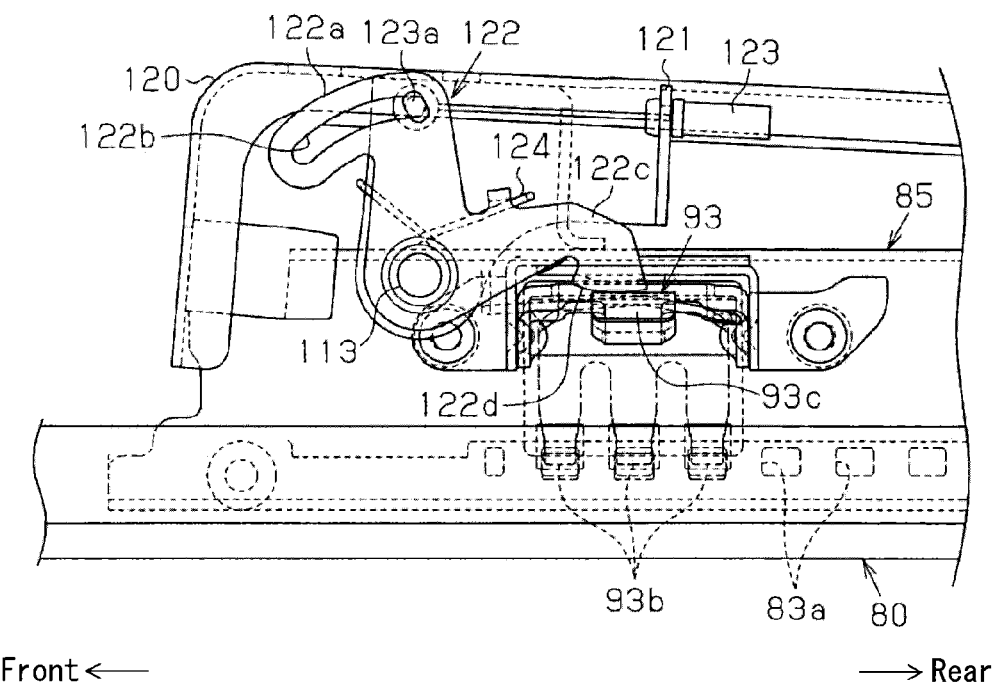
FIG. 24 is a side view illustrating the released state of the locking of the relative movement of the upper rail relative to the lower rail in association with the operation of the release handle according to the second embodiment.

In the aforementioned state as illustrated in FIG. 23, in a case where the release handle is operated and the attachment portion 122a of the second release lever 122 is pulled in the rearward direction of the vehicle as illustrated in FIG. 24, the lock lever 93 of which the input portion 93c is pressed by the pressing portion 122d of the second release lever 122 that rotates from the standby position rotates against the biasing force of the lock spring 95 in the direction where the input portion 93c is lowered, i.e., where the locking protrusions 93b disengage from the corresponding locking holes 83a, for example.

Figure 19:
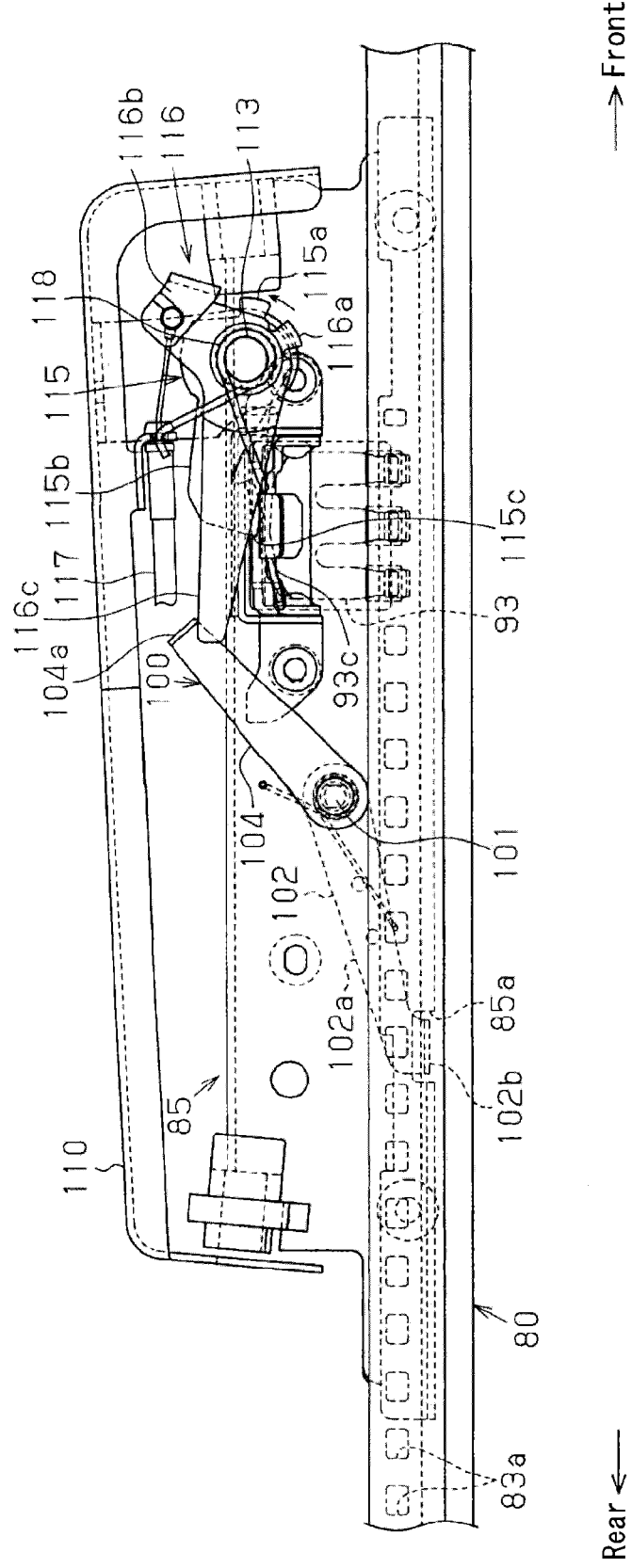
FIG. 19 is a side view illustrating the released state of the locking of the relative movement of the upper rail relative to the lower rail in association with the operation of the release handle according to the second embodiment.

As shown in FIGS. 13 and 19, the first release lever 115 connected to the second release lever 122 via the connection bar 113 also rotates from the standby position illustrated in FIG. 13 so that the lock lever 93 of which the input portion 93c is pressed by the pressing portion 115c rotates against the biasing force of the lock spring 95 in the direction where the input portion 93c is lowered, i.e., where the locking protrusions 93b disengage from the corresponding locking holes 83a, for example, as illustrated in FIG. 19. The lever member 116 that is supported to be rotatable at the connection bar 113 causes the connection bar 113 to rotate in an idle manner while being held at the initial rotation position.

Accordingly, the locking of the relative rotation between the lower rails 80 and the upper rails 85 is released. The position of the seat 5 supported by the upper rails 85 may be adjusted in the front-rear direction.

On the other hand, in a case where the seatback 8 is folded forward as shown from the state illustrated in FIG. 13 to the state illustrated in FIG. 20, the lever member 116 rotates in the release direction. The first release lever 115 of which the pressed portion 115a is pressed by the pressing portion 116a of the lever member 116 then rotates from the standby position so that the lock lever 93 of which the input portion 93c is pressed by the pressing portion 115c rotates against the biasing force of the lock spring 95 in the direction where the input portion 93c is lowered, i.e., where the locking protrusions 93b disengage from the corresponding locking holes 83a, for example.

Figure 25:
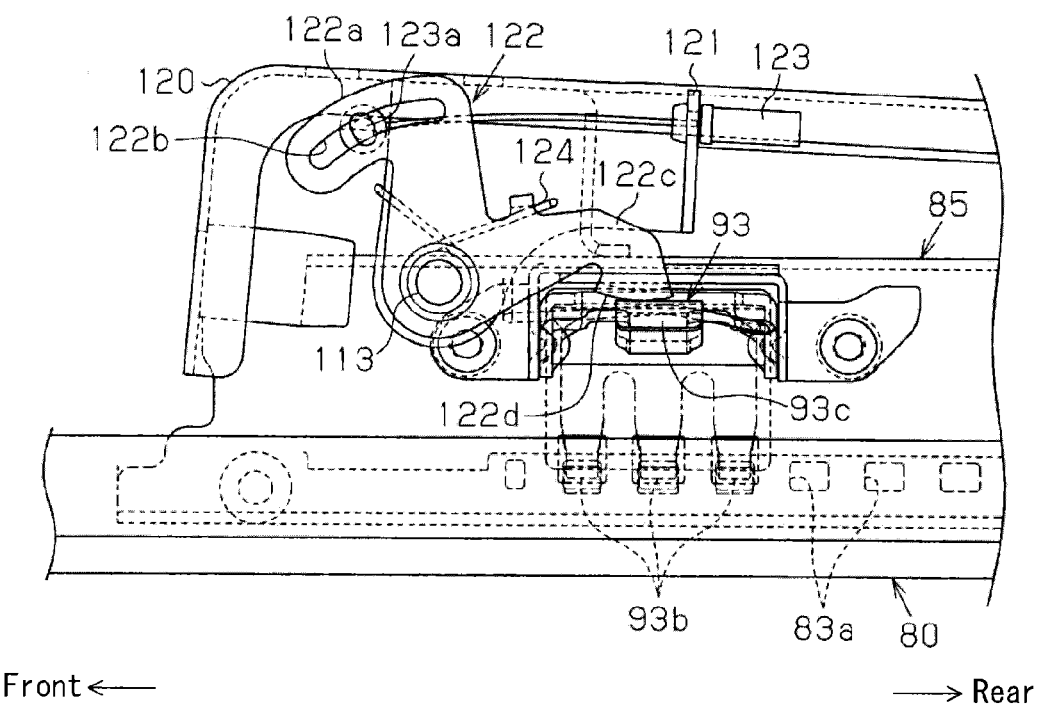
FIG. 25 is a side view illustrating the released state of the locking of the relative movement of the upper rail relative to the lower rail in association with the forward folding of the seatback according to the second embodiment.

In addition, as illustrated in FIGS. 23 and 25, the second release lever 122 connected to the first release lever 115 via the connection bar 113 also rotates from the standby position so that the lock lever 93 of which the input portion 93c is pressed by the pressing portion 122d rotates against the biasing force of the lock spring 95 in the direction where the input portion 93c is lowered, i.e., where the locking protrusions 93b disengage from the corresponding locking holes 83a, for example. The second release lever 122 at which the first end 123a of the second release cable 123 is inserted to be positioned within the elongated bore 122b rotates from the standby position in a state where the elongated bore 122b moves relative to the first end 123a in an idle manner. Accordingly, the rotation of the second release lever 122 in association with the forward folding of the seatback 8 is inhibited from being transmitted to the release handle.

Accordingly, the locking of the relative movement between the lower rails 80 and the upper rails 85 is released. Timing at which the locking of the relative movement between the lower rail 80 and the upper rail 85 in the first pair is released by the lock lever 93 at the first side in association with the forward folding of the seatback 8 is specified to be synchronized with timing at which the locking of the relative movement between the lower rail 80 and the upper rail 85 in the second pair is released by the lock lever 93 at the second side in association with the forward folding of the seatback 8. As long as the seatback 8 is in the forward folded state, each of the lock levers 93 maintains the released state of the locking of the relative movement between the lower rail 80 and the upper rail 85. That is, in the forward folded state of the seatback 8, the upper rails 85 (the seat 5) are allowed to move in the forward direction of the vehicle until the movement in the forward direction is restricted by a known stopper mechanism (which corresponds to a so-called walk-in operation).

As illustrated in FIG. 20, in a state where the seatback 8 is forward folded and the lever member 116 rotates in the release direction, the pressed portion 104a of the memory link 100 is released from the engagement portion 116c of the lever member 116 and thus the memory link 100 is biased by the memory link biasing member 109. The first and second engagement portions 102b and 103b of the memory link 100 make contact with the respective lower ends of the first flanges 83 so that the memory link 100 is held at the engageable position. At this time, as long as the memory link 100 (specifically, the first and second engagement portions 102b and 103b) is positioned at the rear side of the stopper portion 90 (specifically the engagement surface 90b), the upper rail 85 is movable in the front-rear direction relative to the lower rail 80.

Figure 22A:
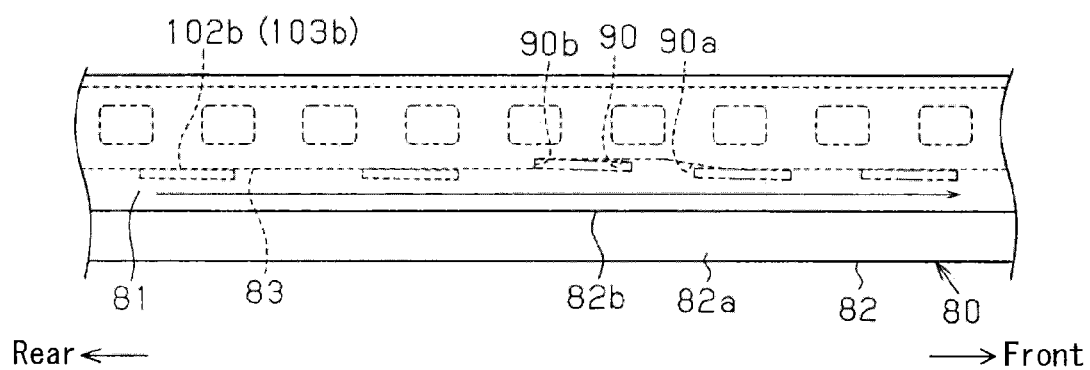
FIG. 22A is a side view illustrating a state where the memory link that moves forward after the forward folding of the seatback is passing through the stopper portion according to the second embodiment.

Specifically, as illustrated in FIG. 22A, in a case where the first and second engagement portions 102b and 103b of the memory link 100 reach the respective stopper portions 90 in association with the movement of the upper rail 85 relative to the lower rail 80 in the forward direction, the first and second engagement portions 102b and 103b pass through, i.e., move beyond, the respective stopper portions 90.

Figure 22B:
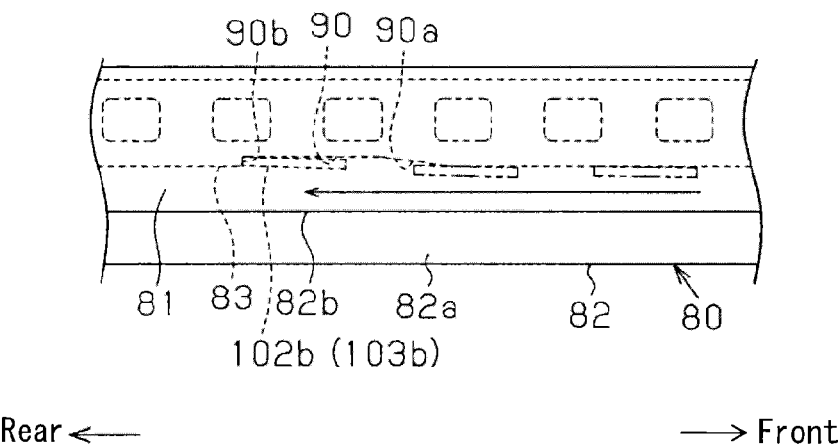
FIG. 22B is a side view illustrating a state where the memory link that moves rearward after passing through the stopper portion engages with the stopper portion according to the second embodiment.

On the other hand, as illustrated in FIG. 22B, in a case where the first and second engagement portions 102b and 103b of the memory link 100 which have passed through or moved beyond the respective stopper portions 90 then reach the respective stopper portions 90 in association with the movement of the upper rail 85 relative to the lower rail 80 in the rearward direction of the vehicle, the memory link 100 in the engageable position swings or vibrates in a state where the upper surfaces of the first and second engagement portions 102b and 103b are guided by the respective guide surfaces 90a of the stopper portions 90. In addition, the first and second engagement portions 102b and 103b are brought to make contact with the respective engagement surfaces 90b of the stopper portions 90. As a result, the movement of the memory link 100 in the rearward direction of the vehicle together with the upper rail 85 is inhibited. The lower rail 80 and the upper rail 85 return to the relative position at which the memory link 100 (specifically, the first and second engagement portions 102b and 103b) is in contact with the stopper portions 90 (specifically, the engagement surfaces 90b). The aforementioned relative position will be hereinafter also referred to as the neutral position. The neutral position is specified on a basis of the relative position between the lower rail 80 and the upper rail 85, which may be mostly obtained or applied in a case where an ordinary occupant is seated in the seat.

Thereafter, in a case where the seatback 8 is pulled back to release the forward folded state of the seatback 8, the lever member 116 rotates in the clockwise direction about the connection bar 113 to return to the initial rotation position and the memory link 100 rotates in the counterclockwise direction about the rotation shaft 101 to return to the separation position as illustrated in FIG. 13. Further, the first release lever 115 together with the second release lever 122 returns to the respective standby positions. In association with the aforementioned operations, the lock levers 93 which are released from the first and second release levers 115 and 122 (specifically, the pressing portions 115c and 122d) respectively lock the relative movement between the lower rails 80 and the upper rails 85. Timing at which the relative movement between the lower rail 80 and the upper rail 85 in the first pair is locked by the lock lever 93 at the first side is specified to be synchronized with timing at which the relative movement between the lower rail 80 and the upper rail 85 in the second pair is locked by the lock lever 93 at the second side in association with the release of the forward folded state of the seatback 8.

Accordingly, in a case where the upper rail 85 moves forward in the vehicle (i.e., to the front side of the seat) in association with the forward folding of the seatback 8 and thereafter moves rearward, the relative position between the lower rail 80 and the upper rail 85 returns to the neutral position after the forward folded state of the seatback 8 is released.

In the present embodiment, in a case where the upper rail 85 is arranged at an arbitrary position within the movable range thereof relative to the lower rail 80 in association with the forward folding of the seatback 8 and then the seatback 8 is pulled back to release the forward folded state, the lock levers 93 (the first and second lock levers or members) are released from the first and second release levers 115 and 122 each of which returns to the standby position in association with the return of the lever member 116 to the initial rotation position. Consequently, the relative movement of the upper rails 85 relative to the lower rails 80 is restricted. That is, without the return to the neutral position of the lower rails 80 and the upper rails 85, the relative movement of the upper rails 85 relative to the lower rails 80 may be locked at the time the forward folded state of the seatback 8 is released.

In a case where the seatback 8 is pulled back to release the forward folded state, the memory link 100 returns to the separation position. Therefore, even when the release handle is operated to move the upper rail 85 in the front-rear direction, the memory link 100 (specifically the first and second engagement portions 102b and 103b) is inhibited from interfering with the stopper portions 90 to block the movement of the upper rail 85.

According to the second embodiment, in the same way as the first embodiment, the relative movement of the upper rails 85 relative to the lower rails 80 may be locked at the time the forward folded state of the seatback 8 is released, without the return to the neutral position of the lower rails 80 and the upper rails 85. Thus, in a case where the seatback 8 is brought to a state so that an occupant may be seated in the seat, i.e., whenever the seatback 8 is ready for an occupant to be seated, the relative movement of the upper rails 85 relative to the lower rails 80 is locked, which may improve operability of the seat slide apparatus. In addition, the stopper portions 90 are formed by cutting at the first flanges 83 of the lower rail 80 so that the first and second engagement portions 102b and 103b are engageable with the respective stopper portions 90. Thus, as compared to a case where the stopper portions are separately and individually provided, the number of components may be reduced.

In addition, the memory link 100, for example, related to the return of the relative position of the upper rails 85 relative to the lower rails 80 to the neutral position may be provided at one of the first and second pairs of the upper rail 85 and the lower rail 80 provided at one of the first and second sides in the width direction. Thus, as compared to a case where the memory link 100, for example, is provided at each of the first and second pairs of the upper rail 85 and the lower rail 80, the number of components may be reduced.

At one of the pairs of the lower rail 80 and the upper rail 85 at which the lever member 116 is provided (which corresponds to the first pair in the present embodiment), in a case where the lever member 116 rotates from the initial rotation position thereof in association with the forward folding of the seatback 8 against the biasing force of the lever biasing member 118, the first release lever 115 that is pressed by the pressing portion 116a of the lever member 116 rotates so that the lock lever 93 provided at the first pair of the lower rail 80 and the upper rail 85 is pressed in the rotation direction where the locking of the relative movement of the upper rail 85 relative to the lower rail 80 is released. Therefore, the lock lever 93 provided at the first pair of the lower rail 80 and the upper rail 85 releases the relative movement of the upper rail 85 relative to the lower rail 80.

On the other hand, at the other of the first and second pairs of the lower rail 80 and the upper rail 85 at which the lever member 116 is not provided (which corresponds to the second pair in the present embodiment), the second release lever 122 together with the connection bar 113 integrally rotates with the first release lever 115 by the rotation thereof in association with the forward folding of the seatback 8. Then, the lock lever 93 provided at the second pair of the lower rail 80 and the upper rail 85 is pressed in the rotation direction where the locking of the relative movement of the upper rail 85 relative to the lower rail 80 is released. As a result, the lock lever 93 provided at the second pair of the lower rail 80 and the upper rail 85 releases the relative movement of the upper rail 85 relative to the lower rail 80.

Consequently, in association with the forward folding of the seatback 8, the lock levers 93 provided at the first and second pairs of the lower rail 80 and the upper rail 85 at the first and second sides in the width direction are operated in association with each other to release the relative movement of the upper rails 85 relative to the lower rails 80. The aforementioned embodiments may be modified as follows.

In the first embodiment, the first bell crank link 70 is held at the initial rotation position via the memory link 60 which is restricted from rotating by the upper rail 4 (specifically, the hole 15a). Alternatively, the first bell crank link 70 may be held at the initial rotation position independently (i.e., by itself) or by the engagement with an appropriate member which is separately or individually provided from the memory link 60.

In the first embodiment, in a state where the first bell crank link 70 rotates in the release direction, the lever projection 62 of the memory link 60, the memory link 60 being released from the first bell crank link 70, may be in contact with the bottom wall portion 12 of the lower rail 3. That is, while being arranged at the engageable position, the memory link 60 may be in contact with the bottom wall portion 12 of the lower rail 3.

In the first embodiment, instead of the stopper portion 25, a cutting and lifting-up portion including the same form as the stopper portion 25 may be formed at the bottom wall portion 12. In addition, the stopper portion 25 may be provided at each of the lower rails 3 and the memory link 60 may be provided at each of the upper rails 4. That is, the mechanism related to the return to the neutral position of the lower rails 3 and the upper rails 4 after the forward folding of the seatback 8 may be provided at both the lower rails 3 in the first and second pairs, for example, provided at the first and second sides in the width direction.

In the first embodiment, the opposed ends (the first and second ends) of the fixation pin 26 may be fixed to the respective second side wall portions 14. In addition, the fixation pin 26 may not be arranged at a substantially center portion between the second lower ball guide portions 19 and the second upper ball guide portions 16a in the up-down direction.

In the first embodiment, the axis line of the memory link 60 (the fixation pin 26) may not extend in the width direction. In the same way, the axis line of the second bell crank link 75 (the support shaft 76) may not extend in the width direction.

In the first embodiment, the release cables 73 and 78 connected to the first and second bell crank links 70 and 75 respectively may be a branch cable that is connected to be a single cable at a connection portion relative to the seatback 8.

In the first embodiment, one of the release cables 73 and 78 connected to the first and second bell crank links 70 and 75 may be omitted so that the first and second bell crank links 70 and 75 are connected to each other via a torque rod.

In the first embodiment, the lock lever 30 may be made of a single plate material so that the stem portion 31 and the lock plate 39 are integrally formed. In addition, instead of the elongated hole 35, a round bore may be formed at the lock lever 30 (specifically, the stem portion 31). Then, the support shaft 22 is inserted to be positioned within the round bore so that the lock lever 30 may be rotatably connected to the upper rail 4.

In the second embodiment, the lever member 116 may not be arranged to be coaxial with the first release lever 115, for example. That is, the lever member 116 may be supported to be rotatable about a rotation shaft independent from the connection bar 113. In such case, the axis line of the lever member 116 may not necessarily extend in the width direction.

In the second embodiment, the stopper portion may be provided at each of the lower rails 80 and the memory link 100 may be provided at each of the upper rails 85. The pair of stopper portions and the pair of memory links 100 may be provided accordingly. That is, the mechanism related to the return to the neutral position of the lower rails 80 and the upper rails 85 after the forward folding of the seatback 8 may be provided at each of the lower rails 80 in the first and second pairs, for example.

In each of the first and second embodiments, each of the lower rails 3, 80 may be made of plural plate materials that are bonded by welding, for example. In addition, each of the upper rails 4, 85 may be made of plural plate materials that are bonded by welding, for example.

In each of the first and second embodiments, the movement of each of the upper rails 4, 85 (i.e., the seat 5) in association with the forward folding of the seatback 8 may be achieved by a biasing force of an appropriate biasing member or may be manually performed by an occupant of the seat, for example.

In each of the first and second embodiments, a single lower rail 3, 80 and a single upper rail 4, 85 (single seat slide apparatus) may be provided at the seat 5, or three or more of the lower rails 3, 80 and three or more of the upper rails 4, 85 may be provided at the seat 5.

In each of the first and second embodiments, the direction of relative movement between the lower rails 3, 80 and the upper rails 4, 85 may correspond to the width direction of the vehicle, for example.

According to the aforementioned embodiments, in a case where the seatback 8 is brought to a state so that an occupant may be seated in the seat 5, i.e., whenever the seatback 8 is ready for an occupant to be seated, the relative movement between the lower rail 3, 80 and the upper rail 4, 85 may be restricted regardless of the relative position of the lower rail 3, 80 and the upper rail 4, 85.

According to the aforementioned first and second embodiments, in a case where the lever member 70, 116 rotates in the release direction from the initial rotation position against the biasing force of the lever biasing member 72, 118 in association with the forward folding of the seatback 8, the lock lever 30, 93 is pressed in the rotation direction where the restriction of the relative movement of the upper rail 4, 85 relative to the lower rail 3, 80 is released. Then, the lock lever 30, 93 releases the restriction of the relative movement of the upper rail 4, 85 relative to the lower rail 3, 80. The upper rail 4, 85 is brought to be movable in the front-rear direction of the seat 5. In addition, the memory link 60, 100 is released from the lever member 70, 116 so that the memory link 60, 100 rotates to the engageable position to be held thereat. In the aforementioned state, in a case where the upper rail 4, 85 moves forward in the vehicle (i.e., moves to the front side of the seat 5), the memory link 60, 100 reaches and pass through the stopper portion 25, 90. On the other hand, in a case where the upper rail 4, 85 moves rearward in the vehicle (i.e., moves to the rear side of the seat 5) after the memory link 60, 100 passes through the stopper portion 25, 90, the memory link 60, 100 reaches the stopper portion 25, 90 to engage therewith to thereby restrict the movement of the upper rail 4, 85 rearward. That is, the lower rail 3, 80 and the upper rail 4, 85 return to the relative position corresponding to the state where the memory link 60, 100 reaches the stopper portion 25, 90 (i.e., the neutral position).

Afterwards, in a case where the forward folded state of the seatback 8 is released, the lever member 70, 116 returns to the initial rotation position by the biasing force of the lever biasing member 72, 118. In addition, the memory link 60, 100 which is inhibited from rotating by the lever member 70, 116 returns to the separation position against the biasing force of the memory link biasing member 63, 109. Then, the lock lever 30, 93 that is released from the lever member 70, 116 restricts the relative movement of the upper rail 4, 85 and the lower rail 3, 80.

Accordingly, in a case where the upper rail 4, 85 moves forward in the vehicle until the memory link 60, 100 completes passing through the stopper portion 25, 90 in association with the forward folding of the seatback 8, and then moves rearward, the relative position between the lower rail 3, 80 and the upper rail 4, 85 returns to the neutral position after the forward folded state of the seatback 8 is released.

According to the first embodiment, the lower rail 3 includes the pair of first side wall portions 11 arranged to face each other in the width direction of the lower rail 3, the bottom wall portion 12 connecting the respective lower ends of the first side wall portions 11, and the pair of first flanges 13 extending inwardly in the width direction to approach each other from the respective upper ends of the first side wall portions 11 and being folded back towards the respective lower ends of the first side wall portions 11. The upper rail 4 includes the pair of second side wall portions 14 arranged to face each other in the width direction of the upper rail 4 between the first flanges 13 of the lower rail 3, the cover wall portion 15 connecting the respective upper ends of the second side wall portions 14, and the pair of second flanges 16 extending outwardly in the width direction to be away from each other from the respective lower ends of the second side wall portions 14 and being folded back to be surrounded by the first side wall portions 11 and the first flanges 13 of the lower rail 3. The width direction of the upper rail 4 corresponds to the width direction of the lower rail 3. The lock lever 30 is connected to the upper rail 4 to be rotatable around the axis line of the lock lever 30 that extends in the width direction at the inner side of the second side wall portions 14 in the width direction, the lock lever 30 selectively locking the relative movement between the lower rail 3 and the upper rail 4 by rotating in the up-down direction to engage and disengage relative to the lower rail 3. The stopper portion 25 is provided at the bottom wall portion 12. The lever member (the first bell crank link) 70 is rotatably connected to the upper portion of the upper rail 4. The memory link 60 is connected to the upper rail 4 to be rotatable around the axis line of the memory link 60 that extends in the width direction at the inner side of the second side wall portions 14 in the width direction, the memory link 60 including the engagement portion 61a that penetrates through the cover wall portion 15 of the upper rail 4, the memory link 60 being restricted from rotating by the lever member (the first bell crank link) 70 in a state where the engagement portion 61a makes contact with the lever member (the first bell crank link) 70 that is arranged at the initial rotation position.

According to the first embodiment, the memory link 60 is made of a plate material that is disposed at a center portion between the pair of second side wall portions 14 of the upper rail 4 in the width direction, and the lever member (the first bell crank link) 70 is made of a plate material that is connected to the upper rail 4 to be rotatable around the axis line of the lever member (the first bell crank link) 70 that extends in the width direction.

According to the first embodiment, the memory link 60 is supported to be rotatable around the axis line that extends in the width direction by the fixation pin 26 that is inserted to be positioned at the pair of second side wall portions 14, the fixation pin 26 including the first end fixed to one of the second side wall portions 14 and the second end inserted to the other of the second side wall portions 14 to be movable in the width direction.

According to the first embodiment, the upper rail 4 includes the pair of lower ball guide portions 19 formed at the respective lower end portions of the pair of second flanges 16 and guiding a rolling of the balls 20a and the pair of upper ball guide portions 16a formed at the respective upper end portions of the pair of second flanges 16 and guiding the rolling of the balls 20a, and the fixation pin 26 is disposed at a center portion between the pair of lower ball guide portions 19 and the pair of upper ball guide portions 16a in the up-down direction.

According to the first embodiment, the lower rail includes the first and second lower rails 3, the upper rail including the first and second upper rails 4, the lock member including the first and second lock levers 30, the first lower rail 3, the first upper rail 4, and the first lock lever 30 being disposed at the first side in the width direction while the second lower rail 3, the second upper rail 4, and the second lock lever 30 being disposed at the second side in the width direction. The stopper portion 25 is provided at the lower rail 3 at the first side, the memory link 60, the lever member (the first bell crank link) 70, and the lever biasing member 72 being provided at the upper rail 4 at the first side. The seat slide apparatus also includes the second lever member (the second bell crank link) 75 rotatably connected to the upper portion of the upper rail 4 at the second side at which the lever member (the first bell crank link) 70 is inhibited from being provided, the second lever member (the second bell crank link) 75 being held at the initial rotation position at which the second lever member (the second bell crank link) 75 releases the lock lever 30 by a biasing force of the second lever biasing member 72, the second lever member (the second bell crank link) 75 rotating against the biasing force of the second lever biasing member 72 in association with the forward folding of the seatback 8 to press the lock lever 30 at the second side in the rotation direction in which the restriction of the relative movement between the lower rail 3 and the upper rail 4 is released.

According to the second embodiment, the lower rail 80 includes the pair of first side wall portions 81 arranged to face each other in the width direction of the lower rail 80, the bottom wall portion 82 connecting the respective lower ends of the first side wall portions 81, and the pair of first flanges 83 extending inwardly in the width direction to approach each other from the respective upper ends of the first side wall portions 81 and being folded back towards the respective lower ends of the first side wall portions 81. The upper rail 85 includes the pair of second side wall portions 86 arranged to face each other in the width direction of the upper rail 85 between the first flanges 83 of the lower rail 80, the cover wall portion 87 connecting the respective upper ends of the second side wall portions 86, and the pair of second flanges 88 extending outwardly in the width direction to be away from each other from the respective lower ends of the second side wall portions 86 and being folded back to be surrounded by the first side wall portions 81 and the first flanges 83 of the lower rail 80. The width direction of the upper rail 85 corresponds to the width direction of the lower rail 80. The stopper portion 90 serves as the cut portion formed at each of the first flanges 83. The memory link 100 includes the first and second engagement portions 102b and 103b that make contact with the respective first flanges 83 in a case where the memory link 100 is released from the lever member (the first bell crank link) 70 in a state where the lever member (the first bell crank link) 70 rotates in the release direction, the first and second engagement portions 102b and 103b being configured to pass through the stopper portions 90 respectively in a case where the upper rail 85 moves to the front side of the seat 5, the first and second engagement portions 102b and 103b being configured to engage with the stopper portions 90 in a case where the upper rail 85 moves to the rear side of the seat 5 after the first and second engagement portions 102b and 103b pass through the stopper portions 90.

According to the second embodiment, the lower rail includes the first and second lower rails 80, the upper rail including the first and second upper rails 85, the lock member including the first and second lock levers 93, the first lower rail 80, the first upper rail 85, and the first lock lever 93 being disposed at the first side in the width direction while the second lower rail 80, the second upper rail 85, and the second lock lever 93 being disposed at the second side in the width direction. The memory link 100, the lever member 116, and the lever biasing member 118 are provided at the upper rail 85 at the first side. The seat slide apparatus also includes the connection bar 113 including the axis line that extends in the width direction and including the first and second end portions pivotally supported at the first and second upper rails 85 respectively, and the first release lever 115 and the second release lever 122 connected to the first and second end portions of the connection bar 113 respectively to integrally rotate therewith. The lever member 116 includes the pressing portion 116a that presses the first release lever 115 provided at the first side in a state where the lever member 116 rotates in the release direction. The first release lever 115 rotates in a state to be pressed by the pressing portion 116a of the lever member 116 to press the lock lever 93 at the first side in the rotation direction where the lock lever 93 at the first side releases the restriction of the relative movement between the lower rail 80 and the upper rail 85. The second release lever 122 integrally rotates with the first release lever 115 via the connection bar 113 to press the lock lever 93 at the second side in the rotation direction where the lock lever 93 at the second side releases the restriction of the relative movement between the lower rail 80 and the upper rail 85.

According to the first and second embodiments, the biasing force of the lever biasing member 72, 118 for holding the lever member 70, 116 at the initial rotation position is specified to be greater than the biasing force of the memory link biasing member 63, 109 for causing the memory link 60, 100 to rotate from the separation position.

According to the first embodiment, the lowest end portion of the memory link 60 engageable with the stopper portion 25 is positioned at the lower side and at the rear side of the seat 5 relative to a rotation center of the memory link 60.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
a lower rail configured to be fixed to a vehicle floor;
an upper rail configured to be fixed to a seat and connected to the lower rail to be movable relative to the lower rail in a front-rear direction of the seat, the seat including a seatback that is provided at a rear end of the seat in the front-rear direction;
a lock member rotatably connected to the upper rail and selectively restricting a relative movement between the lower rail and the upper rail;
a stopper portion provided at the lower rail;
a lever member rotatably connected to the upper rail and being held at an initial rotation position at which the lever member releases the lock member by a biasing force of a lever biasing member, the lever member rotating in a release direction against the biasing force of the lever biasing member in association with a forward folding of the seatback to press the lock member in a rotation direction in which the restriction of the relative movement between the lower rail and the upper rail is released; and a memory link rotatably connected to the upper rail and being held at a separation position at which the memory link is inhibited from engaging with the stopper portion in a state to be restricted from rotating by the lever member that is arranged at the initial rotation position, the memory link being released from the lever member in a state where the lever member rotates in the release direction and rotating to an engageable position at which the memory link is engageable with the stopper portion by a biasing force of a memory link biasing member, the memory link being configured to pass through the stopper portion in a case where the upper rail moves to a front side of the seat, the memory link engaging with the stopper portion to restrict the upper rail from moving to a rear side of the seat in a case where the upper rail moves to the rear side of the seat after the memory link passes through the stopper portion.

2. The seat slide apparatus according to claim 1, wherein the lower rail includes a pair of first side wall portions arranged to face each other in a width direction of the lower rail, a bottom wall portion connecting respective lower ends of the first side wall portions, and a pair of first flanges extending inwardly in the width direction to approach each other from respective upper ends of the first side wall portions and being folded back towards the respective lower ends of the first side wall portions, the upper rail includes a pair of second side wall portions arranged to face each other in a width direction of the upper rail between the first flanges of the lower rail, a cover wall portion connecting respective upper ends of the second side wall portions, and a pair of second flanges extending outwardly in the width direction to be away from each other from respective lower ends of the second side wall portions and being folded back to be surrounded by the first side wall portions and the first flanges of the lower rail, the width direction of the upper rail corresponding to the width direction of the lower rail, the lock member is connected to the upper rail to be rotatable around an axis line of the lock member that extends in the width direction at an inner side of the second side wall portions in the width direction, the lock member selectively locking the relative movement between the lower rail and the upper rail by rotating in an up-down direction to engage and disengage relative to the lower rail, the stopper portion is provided at the bottom wall portion, the lever member is rotatably connected to an upper portion of the upper rail, and the memory link is connected to the upper rail to be rotatable around an axis line of the memory link that extends in the width direction at the inner side of the second side wall portions in the width direction, the memory link including an engagement portion that penetrates through the cover wall portion of the upper rail, the memory link being restricted from rotating by the lever member in a state where the engagement portion (61a) makes contact with the lever member that is arranged at the initial rotation position.

3. The seat slide apparatus according to claim 2, wherein the memory link is made of a plate material that is disposed at a center portion between the pair of second side wall portions of the upper rail in the width direction, and the lever member is made of a plate material that is connected to the upper rail to be rotatable around an axis line of the lever member that extends in the width direction.

4. The seat slide apparatus according to claim 3, wherein the memory link is supported to be rotatable around the axis line that extends in the width direction by a fixation pin that is inserted to be positioned at the pair of second side wall portions, the fixation pin including a first end fixed to one of the second side wall portions and a second end inserted to the other of the second side wall portions to be movable in the width direction.

5. The seat slide apparatus according to claim 2, wherein the memory link is supported to be rotatable around the axis line that extends in the width direction by a fixation pin that is inserted to be positioned at the pair of second side wall portions, the fixation pin including a first end fixed to one of the second side wall portions and a second end inserted to the other of the second side wall portions to be movable in the width direction.

6. The seat slide apparatus according to claim 5, wherein the upper rail includes a pair of lower ball guide portions formed at respective lower end portions of the pair of second flanges and guiding a rolling of a ball and a pair of upper ball guide portions formed at respective upper end portions of the pair of second flanges and guiding the rolling of the ball, and the fixation pin is disposed at a center portion between the pair of lower ball guide portions and the pair of upper ball guide portions in the up-down direction.

7. The seat slide apparatus according to claim 2, wherein the lower rail includes first and second lower rails, the upper rail including first and second upper rails, the lock member including first and second lock members, the first lower rail, the first upper rail, and the first lock member being disposed at a first side in the width direction while the second lower rail, the second upper rail, and the second lock member being disposed at a second side in the width direction, and the stopper portion is provided at the lower rail at the first side, the memory link, the lever member, and the lever biasing member being provided at the upper rail at the first side, the seat slide apparatus further comprising:

a second lever member rotatably connected to an upper portion of the upper rail at the second side at which the lever member is inhibited from being provided, the second lever member being held at an initial rotation position at which the second lever member releases the lock member by a biasing force of a second lever biasing member, the second lever member rotating against the biasing force of the second lever biasing member in association with the forward folding of the seatback to press the lock member at the second side in a rotation direction in which the restriction of the relative movement between the lower rail and the upper rail is released.

8. The seat slide apparatus according to claim 1, wherein the lower rail includes a pair of first side wall portions arranged to face each other in a width direction of the lower rail, a bottom wall portion connecting respective lower ends of the first side wall portions, and a pair of first flanges extending inwardly in the width direction to approach each other from respective upper ends of the first side wall portions and being folded back towards the respective lower ends of the first side wall portions, the upper rail includes a pair of second side wall portions arranged to face each other in a width direction of the upper rail between the first flanges of the lower rail, a cover wall portion connecting respective upper ends of the second side wall portions, and a pair of second flanges extending outwardly in the width direction to be away from each other from respective lower ends of the second side wall portions and being folded back to be surrounded by the first side wall portions and the first flanges of the lower rail, the width direction of the upper rail corresponding to the width direction of the lower rail, the stopper portion serves as a cut portion formed at each of the first flanges, and the memory link includes first and second engagement portions that make contact with the respective first flanges in a case where the memory link is released from the lever member in a state where the lever member rotates in the release direction, the first and second engagement portions being configured to pass through the stopper portions respectively in a case where the upper rail moves to the front side of the seat, the first and second engagement portions being configured to engage with the stopper portions in a case where the upper rail moves to the rear side of the seat after the first and second engagement portions pass through the stopper portions.

9. The seat slide apparatus according to claim 8, wherein the lower rail includes first and second lower rails, the upper rail including first and second upper rails, the lock member including first and second lock members, the first lower rail, the first upper rail, and the first lock member being disposed at a first side in the width direction while the second lower rail, the second upper rail, and the second lock member being disposed at a second side in the width direction, the memory link, the lever member, and the lever biasing member are provided at the upper rail at the first side, the seat slide apparatus further comprising:

a connection bar including an axis line that extends in the width direction and including first and second end portions pivotally supported at the first and second upper rails respectively; and a first release lever and a second release lever connected to the first and second end portions of the connection bar respectively to integrally rotate therewith;

the lever member including a pressing portion that presses the first release lever provided at the first side in a state where the lever member rotates in the release direction, the first release lever rotating in a state to be pressed by the pressing portion of the lever member to press the lock member at the first side in a rotation direction where the lock member at the first side releases the restriction of the relative movement between the lower rail and the upper rail, the second release lever integrally rotating with the first release lever via the connection bar to press the lock member at the second side in the rotation direction where the lock member at the second side releases the restriction of the relative movement between the lower rail and the upper rail.

10. The seat slide apparatus according to claim 1, wherein the biasing force of the lever biasing member for holding the lever member at the initial rotation position is specified to be greater than the biasing force of the memory link biasing member for causing the memory link to rotate from the separation position.

11. The seat slide apparatus according to claim 1, wherein a lowest end portion of the memory link engageable with the stopper portion is positioned at a lower side and at the rear side of the seat relative to a rotation center of the memory link.

12. A seat slide apparatus for a vehicle, comprising:

a lower rail attached to a vehicle floor;

an upper rail attached to a seat and connected to the lower rail to be movable relative to the lower rail in a front-rear direction of the seat, the seat including a seatback that is provided at a rear end of the seat in the front-rear direction;

a lock member rotatably connected to the upper rail and selectively restricting a relative movement between the lower rail and the upper rail;

a stopper portion provided at the lower rail;

a lever member rotatably connected to the upper rail;

a lever biasing member biasing the lever member;

a memory link rotatably connected to the upper rail; and a memory link biasing member biasing the memory link, the lever member being held at an initial rotation position at which the lever member releases the lock member by a biasing force of the lever biasing member, the lever member rotating in a release direction from the initial rotation position against the biasing force of the lever biasing member in association with a forward folding of the seatback to press the lock member in a rotation direction where the restriction of the relative movement between the lower rail and the upper rail is released, the memory link being held at a separation position at which the memory link is inhibited from engaging with the stopper portion in a state to be restricted from rotating by the lever member that is arranged at the initial rotation position, the memory link being released from the lever member in a case where the lever member rotates in the release direction from the initial rotation position and rotating to an engageable position at which the memory link is engageable with the stopper portion by a biasing force of the memory link biasing member, the memory link at the engageable position being configured to pass through the stopper portion in a case where the upper rail moves to a front side of the seat, the memory link engaging with the stopper portion to restrict the upper rail from moving to a rear side of the seat in a case where the upper rail moves to the rear side of the seat after the memory link passes through the stopper portion.

* * * * *